US011582669B2

(12) United States Patent
Singh et al.

(10) Patent No.: US 11,582,669 B2
(45) Date of Patent: Feb. 14, 2023

(54) PERFORMING HANDOVER BETWEEN SHORT-RANGE AND CELLULAR WIRELESS NETWORKS

(71) Applicant: Apple Inc., Cupertino, CA (US)

(72) Inventors: Ajoy K. Singh, Milpitas, CA (US); Wen Zhao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 804 days.

(21) Appl. No.: 14/867,371

(22) Filed: Sep. 28, 2015

(65) Prior Publication Data

US 2016/0234749 A1 Aug. 11, 2016

Related U.S. Application Data

(60) Provisional application No. 62/112,566, filed on Feb. 5, 2015.

(51) Int. Cl.
| | |
|---|---|
| *H04W 36/30* | (2009.01) |
| *H04W 88/06* | (2009.01) |
| *H04W 36/00* | (2009.01) |
| *H04W 48/02* | (2009.01) |

(52) U.S. Cl.
CPC ....... *H04W 36/30* (2013.01); *H04W 36/0022* (2013.01); *H04W 48/02* (2013.01); *H04W 88/06* (2013.01)

(58) Field of Classification Search
CPC . H04W 36/30; H04W 36/0022; H04W 48/02; H04W 88/06
See application file for complete search history.

(56) References Cited

U.S. PATENT DOCUMENTS

| | | | |
|---|---|---|---|
| 8,391,918 B2 | 3/2013 | Ekici et al. | |
| 9,088,919 B2 | 7/2015 | Surapaneni et al. | |
| 2005/0059400 A1* | 3/2005 | Jagadeesan | H04W 36/30 |
| | | | 455/67.11 |

(Continued)

OTHER PUBLICATIONS

Harri Holma, et al.; "Chapter 8, Heterogeneous Networks"; LTE Advanced: 3GPP Solution for IMT-Advanced; Wiley, XP055349704, ISBN: 978-1-119-97405; Aug. 15, 2012; 24 pages.

(Continued)

*Primary Examiner* — Jael M Ulysse
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to a mobile device that initiates handovers from short-range networks to long-range networks. In various embodiments, a mobile device includes one or more radios that communicate using a plurality of radio access technologies (RATs) including a cellular RAT and a short-range RAT. In such an embodiment, the mobile device stores an indication that the cellular RAT is a preferred RAT for a communication session. The mobile may establish the communication session using the preferred RAT, and in response to determining that a quality of the preferred RAT fails to satisfy a set of quality criteria, may request that the communication session use the short-range RAT. In some embodiments, the mobile device analyzes average packet error rate for the communication session and in response to the average packet error rate satisfying a threshold, requests that the communication session use the cellular RAT.

17 Claims, 13 Drawing Sheets

(56) References Cited

U.S. PATENT DOCUMENTS

| | | | | |
|---|---|---|---|---|
| 2006/0209762 A1* | 9/2006 | Talmola | ............... | H04H 60/41 370/332 |
| 2009/0088159 A1* | 4/2009 | Wu | ................... | H04W 48/18 455/436 |
| 2010/0128664 A1* | 5/2010 | Denny | ................ | H04W 24/04 370/328 |
| 2011/0059739 A1 | 3/2011 | Huang | | |
| 2011/0201336 A1* | 8/2011 | Garrett | ............ | H04W 36/0066 455/436 |
| 2011/0255516 A1* | 10/2011 | Pawar | ................ | H04W 36/14 370/332 |
| 2011/0310850 A1* | 12/2011 | Klingenbrunn | ....... | H04W 36/14 370/332 |
| 2012/0009888 A1* | 1/2012 | Smadi | ................ | H04W 72/1215 455/88 |
| 2012/0057456 A1* | 3/2012 | Bogatin | .............. | H04W 4/80 370/230.1 |
| 2013/0124738 A1* | 5/2013 | Lynch | ............... | H04L 61/4511 709/227 |
| 2013/0196663 A1* | 8/2013 | Yurkevich | ........... | H04W 8/183 455/435.3 |
| 2013/0225161 A1* | 8/2013 | Chhabra | ............ | H04W 36/14 455/426.1 |
| 2013/0295940 A1* | 11/2013 | Chan | ................... | H04W 36/22 455/437 |
| 2013/0315905 A1 | 11/2013 | Chen | | |
| 2014/0248862 A1* | 9/2014 | Periyalwar | ............. | H04L 69/14 455/418 |
| 2014/0293986 A1 | 10/2014 | Drennan | | |
| 2015/0017985 A1* | 1/2015 | Safavi | ............... | H04W 36/0085 455/436 |
| 2015/0023277 A1 | 1/2015 | Kim et al. | | |
| 2015/0172986 A1* | 6/2015 | Salkintzis | ............. | H04W 36/36 455/436 |
| 2015/0319647 A1* | 11/2015 | Kekki | ................... | H04W 36/14 370/236 |
| 2016/0057724 A1* | 2/2016 | Horn | ................... | H04W 60/005 455/435.1 |

OTHER PUBLICATIONS

International Preliminary Report on Patentability for International Application No. PCT/US2016/013841; dated Mar. 22, 2017; 35 pages.

"3rd Generation Partnership Project; Technical Specification Group Services and System Aspects; Architecture enhancements for non-3GPP accesses (Release 12)," 3GPP Standard, 3GPP TS 23.402, 3rd Generation Partnership Project (3GPP), Mobile Competence Centre, France, vol. SA WG2, No. V12.7.0, Dec. 5, 2014, pp. 1-290.

International Search Report and Written Opinion for International Application No. PCT/US2016/013841, dated May 18, 2016, pp. 1-17.

\* cited by examiner

PERFORMING HANDOVER BETWEEN SHORT-RANGE AND CELLULAR WIRELESS NETWORKS

PRIORITY DATA

This application claims the benefit of U.S. Prov. Appl. No. 62/112,566 filed on Feb. 5, 2015, which is incorporated by reference herein in its entirety.

FIELD

The present application relates to wireless communication, and more particularly, to techniques relating to handovers between different radio access technologies.

DESCRIPTION OF THE RELATED ART

Wireless communication systems are rapidly growing in usage. Further, wireless communication technology has evolved from voice-only communications to also include the transmission of data, such as Internet and multimedia content.

Expanding traffic on mobile networks has increased the need for mobile data offloading, wherein a mobile device may access carrier-provided services originally targeted for cellular networks over an alternative wireless network, such as WiFi, one type of wireless local area network (WLAN). One form of mobile data offloading uses the I-WLAN (Interworking Wireless LAN) or SMOG (S2b Mobility based on GTP) architecture to supply carrier-provided services to the mobile device over WiFi. These carrier-provided services may include VVM (Visual VoiceMail), MMS (Multimedia Messaging Service), SMS (Short Messaging Service) and IMS (IP Multimedia Subsystem).

Thus, a user equipment device (UE), which may also be referred to as a mobile device, may communicate using different radio access technologies (e.g., different cellular RATs and/or WLANs) at different times. In various situations, the UE and/or the network may initiate handover between different wireless technologies based on various criteria. For example, consider a situation in which a UE is being used for a voice over LTE (VoLTE) phone call outside a residence and the user steps inside. At this point, the signal strength of the LTE connection may drop (e.g., because of the roof of the residence) and the signal strength of a WiFi connection may increase (e.g., because the user is closer to a WiFi access point). In response, the UE may initiate a handover from VoLTE to WiFi while the network may initiate a handover from VoLTE to another cellular RAT (e.g., a circuit-switched cellular RAT). If the signal strength of the WiFi connection, however, becomes weak, this may result in the UE attempting to frequently hop between the LTE and WiFi connections causing a deterioration in call quality.

SUMMARY

Embodiments are presented related to a user equipment device (UE) that is able to perform handovers between long-range wireless networks (e.g., cellular networks) and short-range wireless networks (e.g., WiFi and Bluetooth networks).

In some embodiments, a UE may support setting a preferred radio access technology (RAT) for communication. In such an embodiment, the UE may attempt to communicate using the preferred RAT unless the preferred RAT is unable to sufficiently support communication. In this event, the UE may transition to using a non-preferred RAT until the quality of the preferred RAT improves. For example, in some embodiments, a user may set the preferred RAT to a cellular RAT. Accordingly, the UE may attempt to communicate using the cellular RAT, but switch to using a non-preferred WiFi RAT if a quality of the cellular RAT is poor. In some embodiments, the UE may evaluate quality for RATs when the UE is actively communicating traffic and/or when the UE is idle. Accordingly, when the UE is evaluating links while idle, the UE may select a RAT for subsequent communications. In some embodiments, the UE may then take appropriate actions in preparation for communicating subsequent traffic using the selected RAT (e.g., registering with an IP multimedia subsystem (IMS) to communicate voice traffic, in some embodiments).

In some embodiments, when evaluating a quality of a RAT, a UE may analyze packet error rate (PER) and/or a number of handovers performed with respect to the RAT, particularly when sufficient received signal strength indication (RSSI) and/or signal-to-noise ratio (SNR) exists. A UE may then determine to no longer use a RAT for an interval if one or both of these analyzed metrics exceeds some threshold. In response to making such a determination, the UE may assign the RAT to a blacklist.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
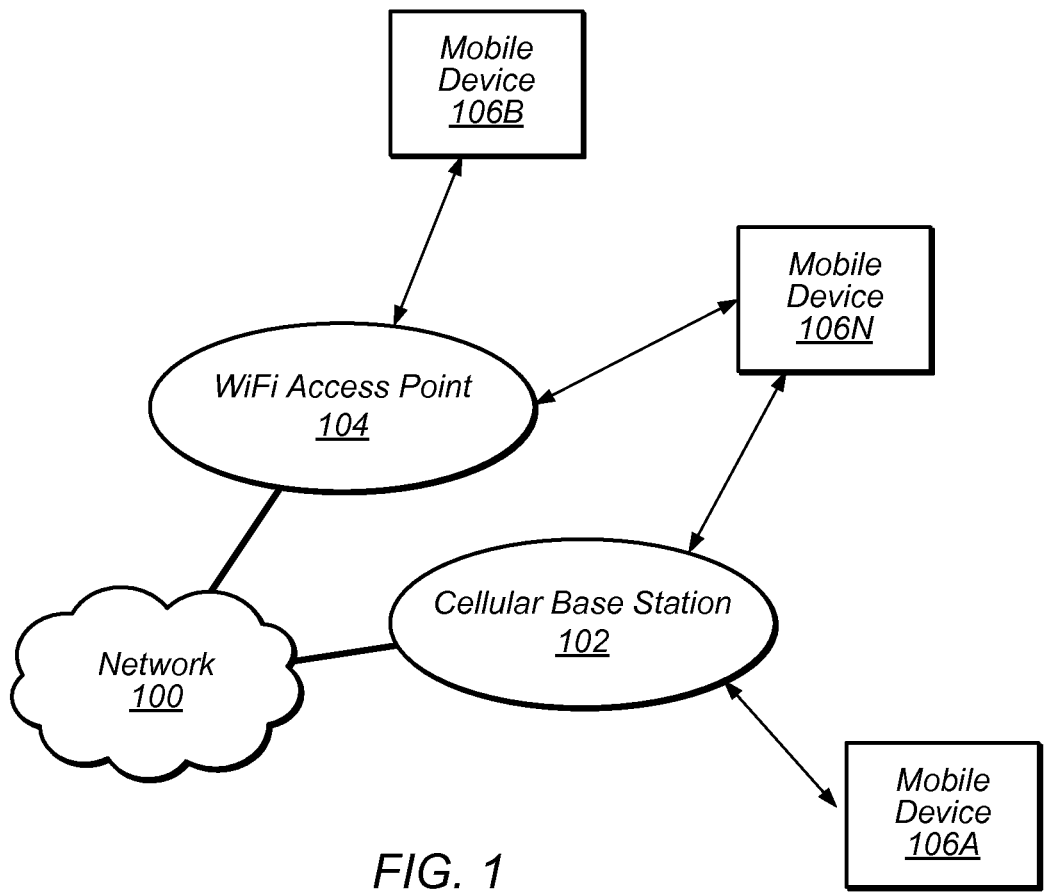
FIG. 1 illustrates an exemplary (and simplified) wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component.

DETAILED DESCRIPTION

The present disclosure describes embodiments in which various techniques may be used to improve communications that transition between short-range wireless networks and long-range wireless networks. The disclosure begins with a discussion of an exemplary communication system including various components with respect to FIGS. 1-6. Examples of handovers are then discussed with respect to FIGS. 7-9. Various techniques to improve communications that experience handovers are described with respect to FIGS. 10-12. In particular, embodiments in which a link associated with a radio access technology (e.g., cellular or WiFi) may be selected and associated handovers for cellular and/or WiFi link preferences are described in conjunction with FIGS. 11A-D. Techniques for reducing handovers are then described in conjunction with FIGS. 12A and 12B.

ACRONYMS

The following acronyms are used in the present disclosure.

BS: Base Station
AP: Access Point
APN: Access Point Name
LTE: Long Term Evolution
VoLTE: Voice over LTE
VOIP: Voice Over IP
IMS: IP Multimedia Subsystem
MO: Mobile Originated
MT: Mobile Terminated
RAT: Radio Access Technology
TX: Transmit
RX: Receive
WLAN: Wireless Local Area Network
I-WLAN: Interworking WLAN
SIP: Session Initiation Protocol
PDN: Packet Data Network
PGW: PDN Gateway
SGW: Serving Gateway
P-CSCF: Proxy Call Session Control Function
ePDG: evolved Packet Data Gateway
IFOM: IP Flow Mobility SMOG: S2b Mobility based on GTP
GTP: GPRS Tunneling Protocol
GPRS: General Packet Radio Service Glossary The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc.

In general, the term "UE" or "UE device" can be broadly defined to encompass any electronic, computing, and/or telecommunications device (or combination of devices) which is easily transported by a user and capable of wireless communication.

Mobile Device—any of various types of communication devices which are mobile and are capable of communicating on a cellular network and a non-cellular network, such as WiFi. A UE is an example of a mobile device.

Base Station—The term "Base Station" has the full breadth of its ordinary meaning, and at least includes a wireless communication station installed at a fixed location and used to communicate as part of a wireless cellular telephone system or cellular radio system.

Access Point—This term has the full breadth of its ordinary meaning, and at least includes a wireless communication device which offers connectivity to a wireless local area network (WLAN), such as a WiFi network.

WiFi—This term has the full breadth of its ordinary meaning, and at least includes a wireless local area network technology based on the IEEE (Institute of Electrical and Electronics Engineers) 802.11 standards, and future revisions or enhancements to those standards.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel/Link—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
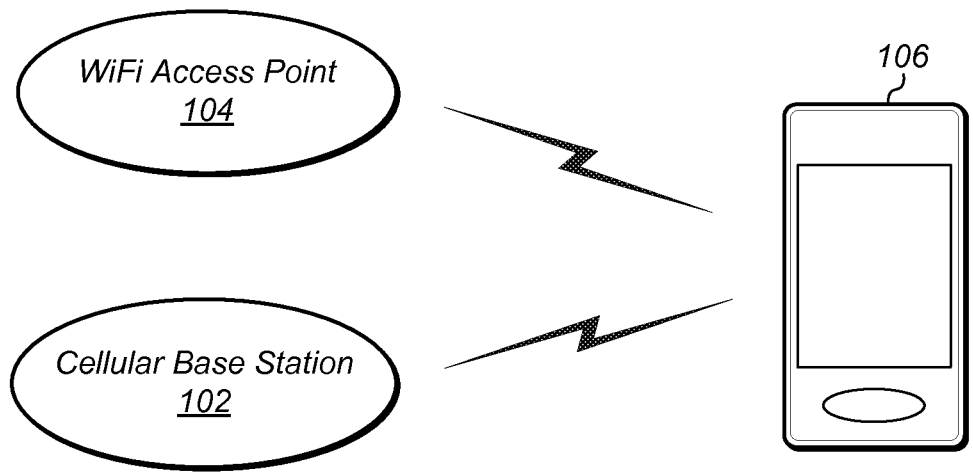
FIG. 2 illustrates a mobile device in communication with a cellular base station and an access point (AP), according to some embodiments.

FIGS. 1 and 2—Communication System

FIG. 1 illustrates an exemplary (and simplified) wireless communication system, according to some embodiments. It is noted that the system of FIG. 1 is merely one example of a possible system, and disclosed embodiments may be implemented in any of various systems, as desired.

As shown, the example wireless communication system includes a cellular base station 102 which may communicate over a transmission medium with one or more mobile devices 106A, 106B, etc., through 106N. Each of the mobile devices may be, for example, a "user equipment device" (UE) or other types of devices as defined above.

The base station 102 may be a base transceiver station (BTS) or cell site, and may include hardware that enables wireless cellular communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the mobile devices and/or between the mobile devices and the network 100.

The communication area (or coverage area) of the base station may be referred to as a "cell." The base station 102 and the UEs 106 may be configured to communicate over the transmission medium using any of various cellular radio access technologies (RATs), also referred to as wireless cellular communication technologies, or telecommunication standards, such as GSM, UMTS (WCDMA, TD-SCDMA), LTE, LTE-Advanced (LTE-A), 3GPP2 CDMA2000 (e.g., 1×RTT, 1×EV-DO, HRPD, eHRPD), WiFi, WiMAX etc. A typical wireless cellular communication system will include a plurality of cellular base stations which provide different coverage areas or cells, with handoffs between cells.

Additionally, the example wireless communication system may include one or more wireless access points (such as access point 104) which may be communicatively coupled to the network 100. Each wireless access point 104 may provide a wireless local area network (WLAN) for communication with mobile devices 106. These wireless access points may comprise WiFi access points. Wireless access point 104 may be configured to support cellular network offloading and/or otherwise provide wireless communication services as part of the wireless communication system illustrated in FIG. 1.

Cellular base station 102 and other similar base stations, as well as access points (such as access point 104) operating according to a different wireless communication standard (e.g., WiFi), may thus be provided as a network which may provide continuous or nearly continuous overlapping service to mobile devices 106 and similar devices over a wide geographic area via one or more wireless communication standards.

Thus, while base station 102 may act as a "serving cell" for a UE 106 as illustrated in FIG. 1, each mobile device 106 may also be capable of receiving signals from (and possibly within communication range of) one or more other cells (which might be provided by other base stations (not shown) and/or wireless local area network (WLAN) access points, which may be referred to as "neighboring cells" or "neighboring WLANs" (e.g., as appropriate), and/or more generally as "neighbors".

FIG. 2 illustrates mobile device 106 (e.g., one of the devices 106A through 106N) in communication with both a WiFi access point 104 and a cellular base station 102, according to some embodiments. The mobile device 106 may be a device with both cellular communication capability and non-cellular communication capability, e.g., WiFi capability, such as a mobile phone, a hand-held device, a computer or a tablet, a wearable device, or virtually any type of wireless device.

The mobile device 106 may include a processor that is configured to execute program instructions stored in memory. The mobile device 106 may perform any of the method embodiments described herein by executing such stored instructions. Alternatively, or in addition, the mobile device 106 may include a programmable hardware element such as an FPGA (field-programmable gate array) that is configured to perform any of the method embodiments described herein, or any portion of any of the method embodiments described herein.

In some embodiments, the mobile device 106 may be configured to communicate using any of multiple radio access technologies/wireless communication protocols. For example, the mobile device 106 may be configured to communicate using any of various cellular communication technologies, such as GSM, UMTS, CDMA2000, LTE, LTE-A, etc. The mobile device may also be configured to communicate using any of various non-cellular communication technologies such as WLAN/WiFi, or GNSS. Other combinations of wireless communication technologies are also possible.

The mobile device 106 may include one or more antennas for communicating using one or more wireless communication protocols or technologies. In some embodiments, the mobile device 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the mobile device 106 may share one or more parts of receive and/or transmit chains between multiple wireless communication technologies, such as those discussed above.

In some embodiments, the mobile device 106 may include separate transmit and/or receive chains (e.g., including separate RF and/or digital radio components) for each wireless communication protocol with which it is configured to communicate. As a further possibility, the mobile device 106 may include one or more radios which are shared between multiple wireless communication protocols, and one or more radios which are used exclusively by a single wireless communication protocol. For example, the mobile device 106 might include a shared radio for communicating using either of LTE or 1×RTT (or LTE or GSM), and separate radios for communicating using each of WiFi and Bluetooth. Other configurations are also possible.

Figure 3:
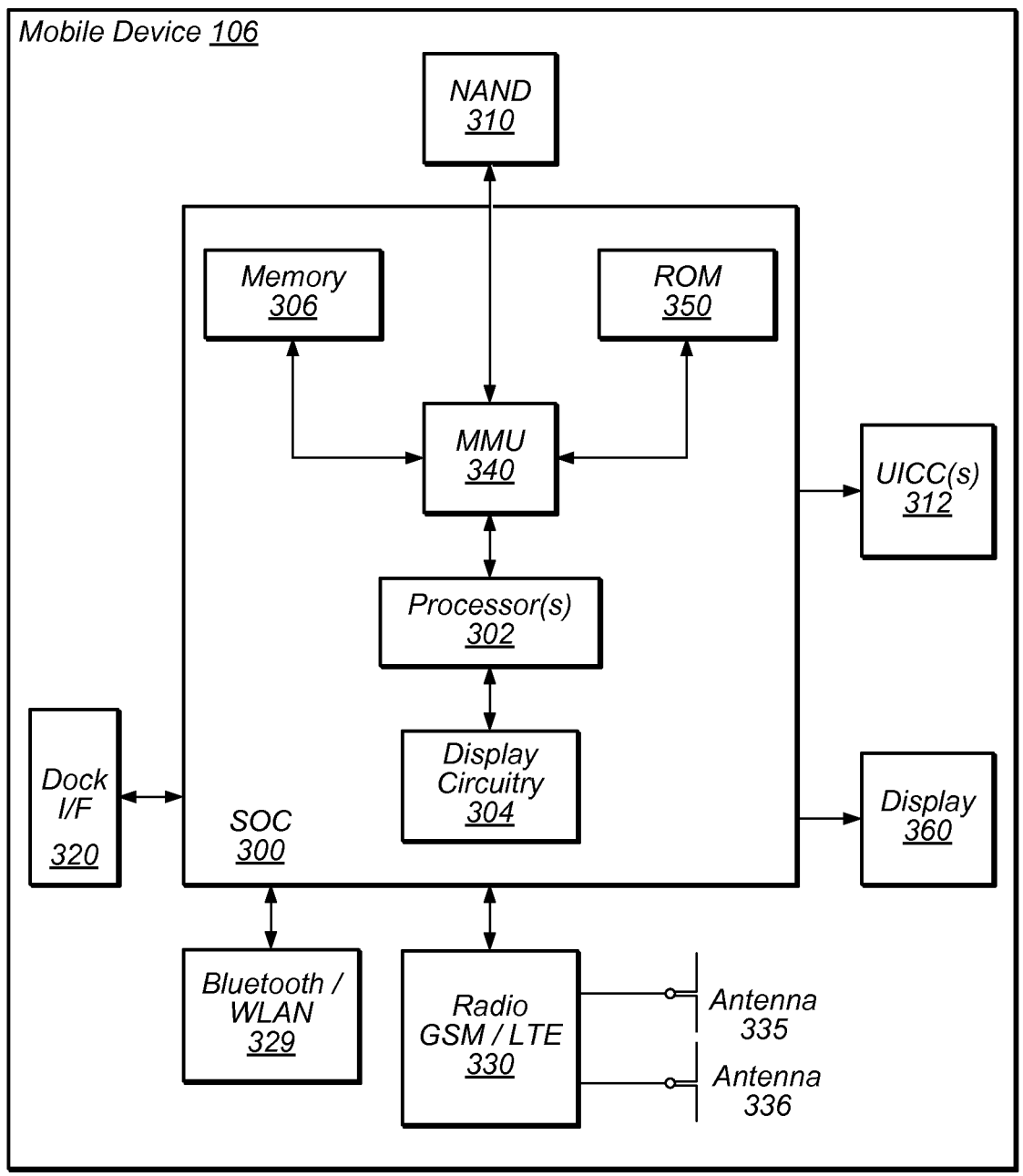
FIG. 3 illustrates an example block diagram of a mobile device, according to some embodiments.

FIG. 3—Mobile Device Block Diagram

FIG. 3 illustrates an example simplified block diagram of a mobile device 106, according to some embodiments. As shown, the mobile device 106 may include a system on chip (SOC) 300, which may include portions for various purposes. The SOC 300 may be coupled to various other circuits of the mobile device 106. For example, the mobile device 106 may include various types of memory (e.g., including NAND flash 310), a connector interface 320 (e.g., for coupling to a computer system, dock, charging station, etc.), the display 360, cellular communication circuitry 330 such as for LTE, GSM, etc., and short range wireless communication circuitry 329 (e.g., Bluetooth™ and WLAN circuitry). The mobile device 106 may further comprise one or more smart cards 312 that comprise SIM (Subscriber Identity Module) functionality, such as one or more UICC(s) (Universal Integrated Circuit Card(s)) cards 312. The cellular communication circuitry 330 may couple to one or more antennas, preferably two antennas 335 and 336 as shown. The short range wireless communication circuitry 329 may also couple to one or both of the antennas 335 and 336 (this connectivity is not shown for ease of illustration).

As shown, the SOC 300 may include processor(s) 302 which may execute program instructions for the mobile device 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector I/F 320, and/or display 360. The MMU 340 may be configured to perform memory protection and page table translation or set up. In some embodiments, the MMU 340 may be included as a portion of the processor(s) 302.

In some embodiments, as noted above, the mobile device 106 comprises at least one smart card 312, such as a UICC 312, which executes one or more Subscriber Identity Module (SIM) applications and/or otherwise implement SIM functionality. The at least one smart card 312 may be only a single smart card 312, or the mobile device 106 may comprise two or more smart cards 312. Each smart card 312 may be embedded, e.g., may be soldered onto a circuit board in the mobile device 106, or each smart card 312 may be implemented as a removable smart card, an electronic SIM (eSIM) or any combination thereof. Any of various other SIM configurations are also contemplated.

As noted above, the mobile device 106 may be configured to communicate wirelessly using multiple radio access technologies (RATs). The mobile device 106 may be configured to communicate according to a WiFi RAT and/or one or more cellular RATs, e.g., such as communicating on both WiFi and cellular at the same time. For example, the mobile device 106 may be communicating on a primary communication channel (such as WiFi), and in response to detected degradation of the primary communication channel may establish a secondary communication channel (such as on cellular). The mobile device 106 may operate to dynamically establish and/or remove different primary and/or secondary communication channels as needed, e.g., to provide the best user experience while attempting to minimize cost.

As described herein, the mobile device 106 may include hardware and software components for implementing the features and methods described herein. The processor 302 of the mobile device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the mobile device 106, in conjunction with one or more of the other components 300, 304, 306, 310, 320, 330, 335, 340, 350, 360 may be configured to implement part or all of the features described herein.

Figure 4:
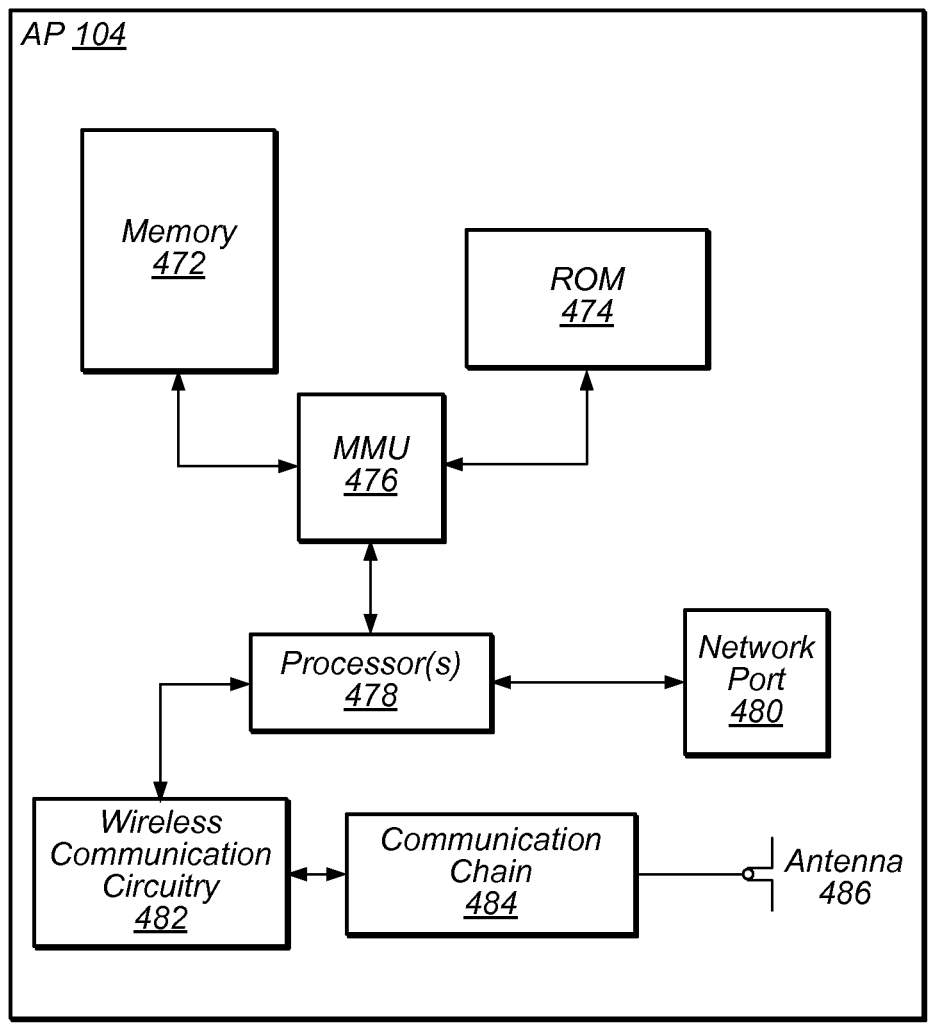
FIG. 4 illustrates an example block diagram of an access point, according to some embodiments.

FIG. 4—Access Point Block Diagram

FIG. 4 illustrates an example block diagram of an access point 104, according to some embodiments. It is noted that the access point 104 of FIG. 4 is merely one example of a possible access point. As shown, the access point 104 may include processor(s) 478 which may execute program instructions for the base station 102. The processor(s) 478 may also be coupled to memory management unit (MMU) 476, which may be configured to receive addresses from the processor(s) 478 and translate those addresses to locations in memory (e.g., memory 472 and read only memory (ROM) 474) or to other circuits or devices.

The access point 104 may include at least one network port 480. The network port 480 may be configured to couple to a network, such as the Internet, and provide a plurality of devices, such as mobile devices 106, access to the network as described above in FIGS. 1 and 2.

The network port 480 (or an additional network port) may also be configured to couple to a cellular network, e.g., a core network of a cellular service provider. The core network may provide mobility related services and/or other services to a plurality of devices, such as mobile devices 106. In some cases, the network port 480 may couple to a telephone network via the core network, and/or the core network may provide a telephone network (e.g., among other mobile devices serviced by the cellular service provider).

The access point 104 may include at least one antenna 486, and possibly multiple antennas. The at least one antenna 486 may be configured to operate as a wireless transceiver and may be further configured to communicate with mobile devices 106 via wireless communication circuitry 482. The antenna 486 communicates with the wireless communication circuitry 482 via communication chain 484. Communication chain 484 may be a receive chain, a transmit chain or both. The wireless communication circuitry 482 and the communication chain 484 may compose a radio. The radio may be configured to communicate via various wireless local area network standards, including, but not limited to WiFi.

Cellular base station 102 may also be described according to the block diagram of FIG. 4, except that communication may be performed using any of various cellular communication technologies.

Figure 5:
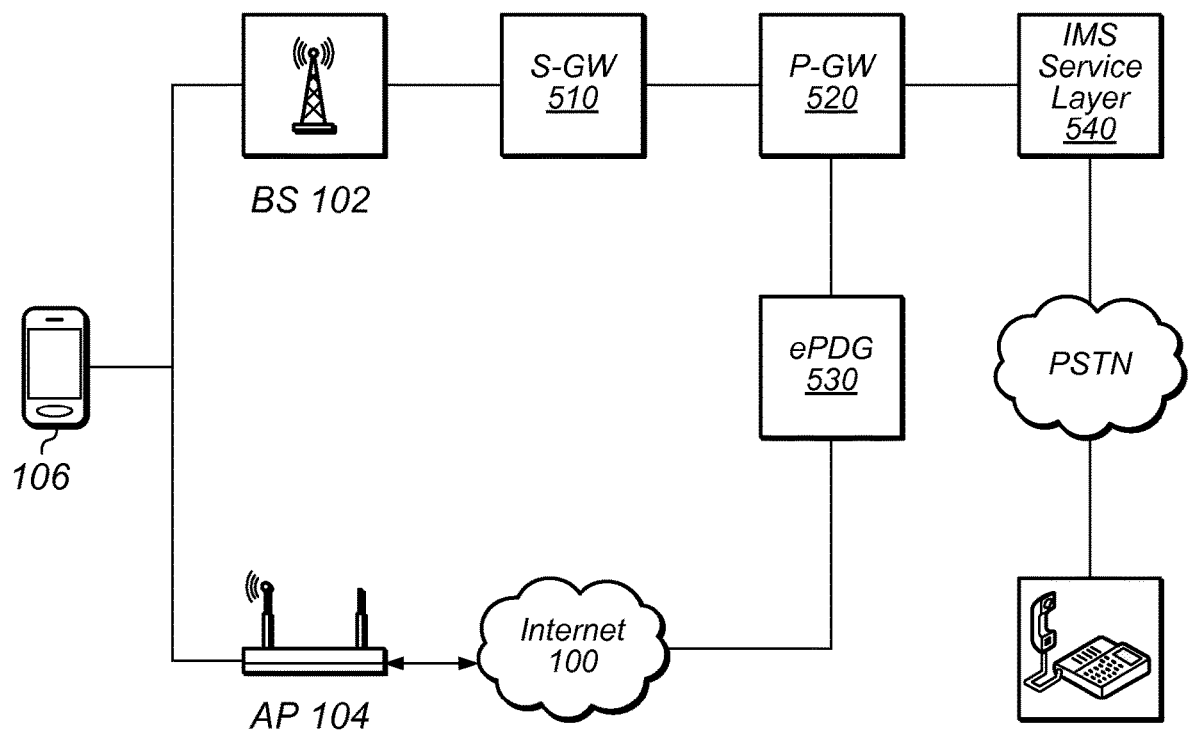
FIG. 5 is a block diagram of an example communication system, according to some embodiments.

FIG. 5—Example Wireless Communication System

FIG. 5 illustrates an example wireless communication system, according to some embodiments. As shown, the mobile device 106 may communicate with a cellular network via cellular base station (BS) 102. The cellular base station 102 may communicate with a Serving Gateway (SGW) 510. In some embodiments, the SGW 510 is responsible for handovers with neighboring base stations. In the illustrated embodiment, SGW 510 couples to a Packet Data Network (PDN) Gateway, or (PGW) 520. As shown, evolved Packet Data Gateway (ePDG) 530 operates to interface between the cellular and WiFi networks. PGW 520 assigns device IP addresses of the iWLAN tunnel interface and the cellular interface. Together ePDG 530, SGW 510 and PGW 520 make up the evolved packet core (EPC).

As shown, mobile device 106 may also communicate with a WiFi access point (AP) 104, where the WiFi access point presents a WiFi network. The WiFi access point 104 may couple through a network, such as the Internet, to the evolved Packet Data Gateway (ePDG) 530. The ePDG 530 is utilized in the network function of 4G mobile core networks, known as the evolved packet core (EPC) mentioned above, as well as future mobile networks, such as 5G networks. As noted above, the ePDG 530 may act as an interface between the EPC and non-3GPP networks that may use secure access, such as WiFi and femtocell access networks.

The PGW may function as an inter-RAT mobility anchor. The PGW 520 may couple to an IMS (IP Multimedia Subsystem) server. The IMS server may comprise a computer system with a processor and memory which performs various operations as described herein. The IMS server may implement an IMS Service Layer 540. The IMS server may also implement a Proxy Call Session Control Function (P-CSCF). The P-CSCF may act as the entry point to the IMS domain and may serve as the outbound proxy server for the mobile device. The mobile device may attach to the P-CSCF prior to performing IMS registrations and initiating SIP sessions. The P-CSCF may be in the home domain of the IMS operator, or it may be in the visiting domain where the mobile device is currently roaming.

The IMS server may couple to other networks such as the public switched telephone network (PSTN) or other types of communication networks, e.g., for communicating with other communication devices, such as a standard POTS telephone (shown), another mobile device, etc.

Figure 6:
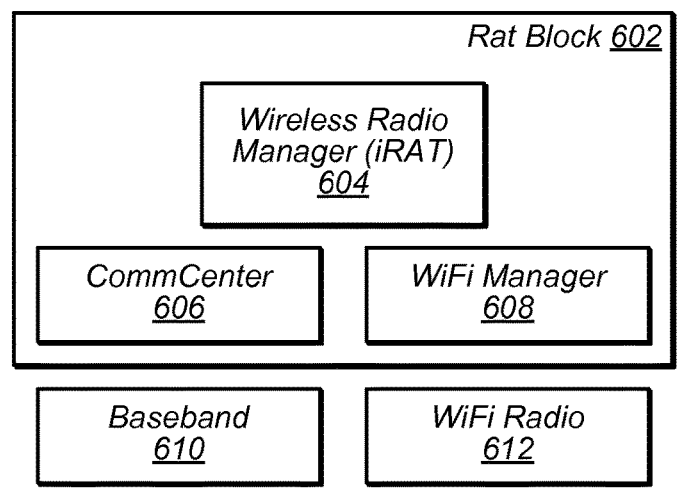
FIG. 6 illustrates various communication components present in some embodiments of the mobile device.

FIG. 6—Mobile Device Functionality

FIG. 6 illustrates example functionality that may be present in the mobile device 106, according to some embodiments. As shown, the mobile device 106 may comprise a RAT block 602 that comprises a wireless radio manager 604, a communication center (CommCenter) block 606, and a WiFi manager block 608. The wireless radio manager 604 may be configured to receive various statistics from the communication center block 606 and/or the WiFi manager block 608 and determine whether to use one or more of available cellular and WiFi connections based on the statistics. In some embodiments, the communication block 606 may manage or control baseband logic 610 (e.g., related to cellular communication), and WiFi manager block 608 may manage or control WiFi radio 612. Although not shown, the RAT block 602 may include a symptoms manager that may report current connection information (e.g., connection metrics or statistics) to the wireless radio manager 604. Elements of the RAT block 502 may be implemented as software or firmware executable by a processor.

Figure 7:
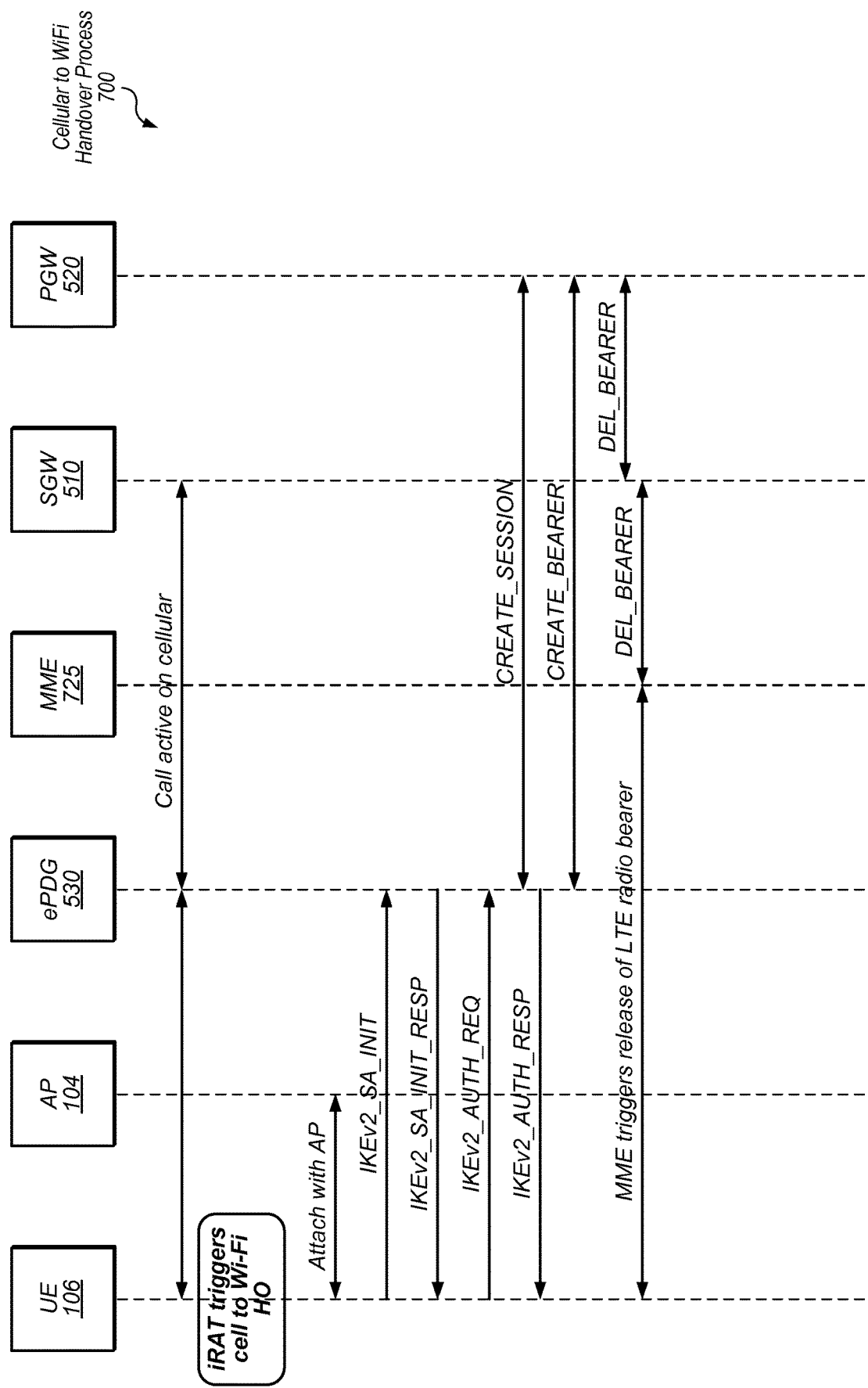
FIG. 7 illustrates a cellular to WiFi handover, which is one example of a UE-initiated handover process, according to some embodiments.

FIG. 7—Exemplary UE-Initiated Cellular to WiFi Handover

FIG. 7 is a communication diagram that illustrates an exemplary cellular to WiFi handover process 700, according to some embodiments. As shown, this process may be triggered by UE 106 (iRAT manager 604 initiates the handover in the illustrated example). Initially, a call for UE 106 is active on a cellular network, via SGW 510. For example, the call may be a VoLTE call utilizing IMS.

Subsequently, iRAT manager 604 triggers a cellular to WiFi handover. As discussed above, iRAT manager 604 may trigger the handover based on various metrics or criteria. In some embodiments, RAT block 602 is configured to determine and track various metrics for cellular and/or WiFi communications. For example, RAT block 602 may maintain cellular information including: reference signal received power (RSRP), signal to noise ratio (SNR), MAC hybrid automatic repeat request (HARM) packet loss, Packet Data Convergence Protocol (PDCP) discard, and/or radio link control (RLC) packet loss, etc. RAT block 602 may use various sets of these metrics to determine the quality of a cellular connection. Similarly, RAT block 602 may maintain WiFi information including: received signal strength indicator (RSSI), SNR, transmit packet error rate (TX PER), and/or receive (RX) PER, etc. RAT block 602 may use various sets of these metrics to determine the quality of a WiFi connection. Based on this information, iRAT manager 604 may be configured to initiate handovers from cellular to WiFi and vice versa. For example, iRAT manage 604 may initiate a handover to WiFi when it determines that a stable WiFi connection has been established with good signal strength and that the cellular connection quality is low.

In this illustrated example, the UE attaches with AP 104 (this may occur before or after triggering of the handover). Subsequently, in the illustrated embodiment UE 106 sends an Internet Key Exchange (IKE) message IKEv2_SA_INIT to ePDG 530 and receives an IKEv2_SA_INIT_RESP response to secure exchange of IKEv2_AUTH message, which is subsequently exchanged. A session and bearer are created between ePDG 530 and PGW 520 for WiFi communication, and the LTE radio bearer is deleted (as triggered by MME 725 in the illustrated embodiment based on signals from PGW 520 and SGW 510).

The handover illustrated in FIG. 7 is shown for exemplary purposes and is not intended to limit the scope of inter-RAT handovers in various embodiments. In various embodiments, a UE may trigger handovers in the other direction (e.g., from WiFi to cellular), between other RATs, etc.

Figure 8:
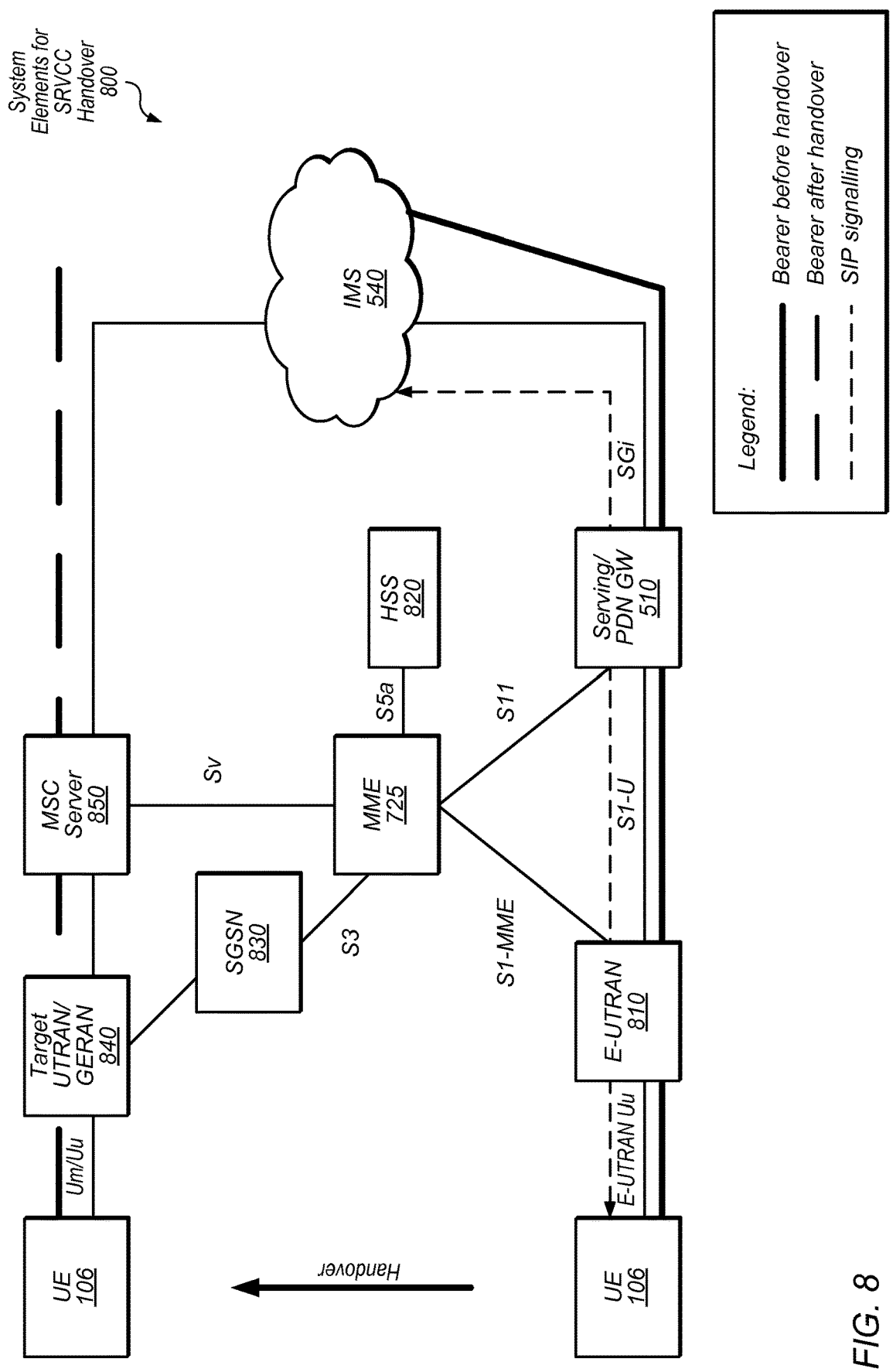
FIGS. 8 and 9 illustrate embodiments of a cellular to cellular handover, which is one example of a network-initiated handover process, according to some embodiments.
Figure 9:
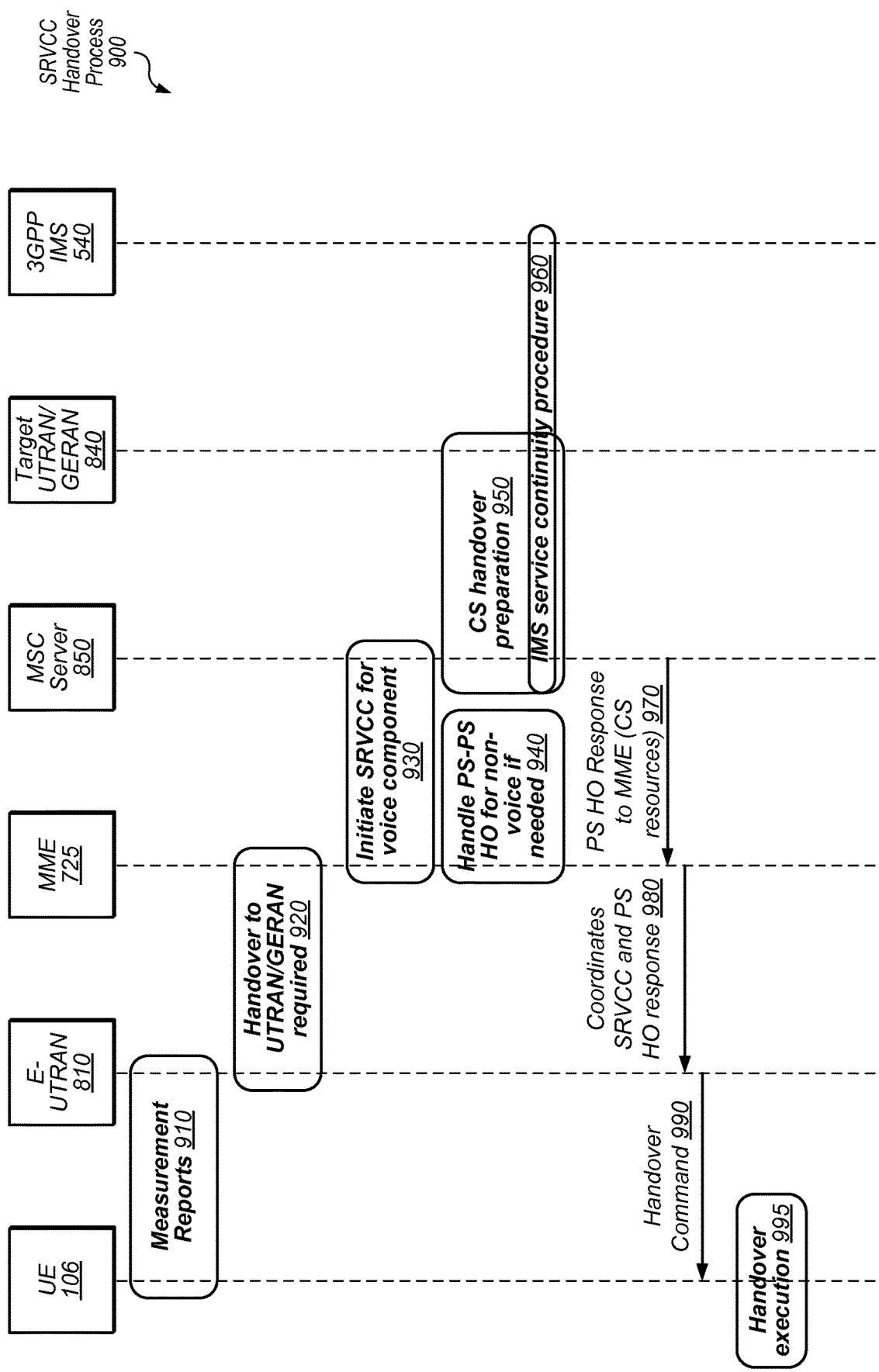

FIGS. 8-9—Exemplary Network-Initiated SRVCC Handover

FIG. 8 illustrates system elements 800 for an exemplary single radio-voice call continuity (SRVCC) handover (which is one example of a network-initiated handover from one cellular communications technology to another), according to some embodiments. FIG. 9, discussed in further detail below, is a communications diagram for the handover, according to some embodiments. In the illustrated embodiment, a packet-switched (PS) communication via evolved UMTS Terrestrial Radio Access (E-UTRAN) 810 is handed over to a circuit-switched (CS) communication via a target UMTS Terrestrial Radio Access (UTRAN)/GSM EDGE Radio Access Network (GERAN) 840.

In the illustrated embodiment, an E-UTRAN bearer (illustrated using the bold solid line) over IMS is used for a call (e.g., a VoLTE call) using serving/packet data network (PDN) GW 510 and mobility management entity (MME) 725. The dashed line with relatively shorter dashes illustrates session initiation protocol (SIP) signaling for IMS for this call. After the handover, a UTRAN/GERAN bearer (shown using the bold dashed line with relatively longer dashes) is used for the call via mobile switching center (MSC) server 850. In the illustrated embodiment, MME 725 is coupled to MSC server 850 via the Sv interface, to serving GPRS support node (SGSN) 830 via the S3 interface, to home subscriber server (HSS) 820 via the S5a interface, to SGW 510 via the S11 interface, and to E-UTRAN 810 via the S1-MME interface. MSC server may be configured to perform various actions to facilitate switching to a CS protocol and may receive tunneled messages from UE 106 via MME 725. In the illustrated embodiment serving GPRS support node (SGSN) 830 is communicatively coupled between target UTRAN/GERAN 840 and MME 725. In the illustrated embodiment, SGW 510 is coupled to IMS service layer 540 via the SGi interface. The SRVCC handover process is described in further detail below with reference to FIG. 9.

FIG. 9 is a communication diagram illustrating an exemplary SRVCC handover process 900, according to some embodiments. In the illustrated embodiment, UE 106 sends one or more measurement reports 910 to E-UTRAN 810. A measurement report may be event-triggered or periodic and may include various types of information from UE 106.

Exemplary events that may trigger a measurement report include: a serving cell becomes better or worse than a defined threshold, a neighbor cell becomes better or worse than a defined threshold, a primary cell becomes worse than a defined threshold and a neighbor becomes better than a second threshold, a neighbor cell becomes some offset better than the serving cell, an inter-RAT neighbor becomes better a defined threshold, primary cell becomes worse than a defined threshold and inter-RAT neighbor becomes better than a second threshold, etc.

E-UTRAN 810 may specify what information should be included in a measurement report, in some embodiments. Exemplary measurement report information includes: what cells the UE can detect, signal strength for various cells, current channel conditions, UE memory buffer, antenna information, number of supported simultaneous transmission streams, data acknowledgements, various information determined by RAT block 602 as described above, etc.

In response to data in the measurement reports, in the illustrated embodiment E-UTRAN 810 signals to MME 725 that a handover to a target UTRAN/GERAN network is required 920. In response, in the illustrated embodiment, MME 725 initiates an SRVCC for voice component 930 and handles a packet-switched to packet-switched (PS-PS) handover for non-voice communications if needed 940. In response, in the illustrated embodiment, MSC server 850 prepares the circuit-switched (CS) handover 950 and performs an IMS service continuity procedure 960. Subsequently, in the illustrated embodiment, MSC server 850 sends PS handover response to MME 725 via transmission 970. In response, in the illustrated embodiment, MME 725 transmits coordinates SRVCC and PS handover response 980. In response, in the illustrated embodiment, E-UTRAN 810 transmits handover command 990 to UE 106 and the handover is subsequently executed 995.

Thus, FIGS. 8-9 illustrate an exemplary SRVCC handover from a PS cellular RAT to a CS cellular RAT. The handover illustrated in FIGS. 8-9 is shown for exemplary purposes and is not intended to limit the scope of inter-cellular-RAT handovers in various embodiments. In various embodiments, a network may trigger handovers in the other direction (e.g., from CS to PS), between other cellular RATs, etc.

Figure 10:
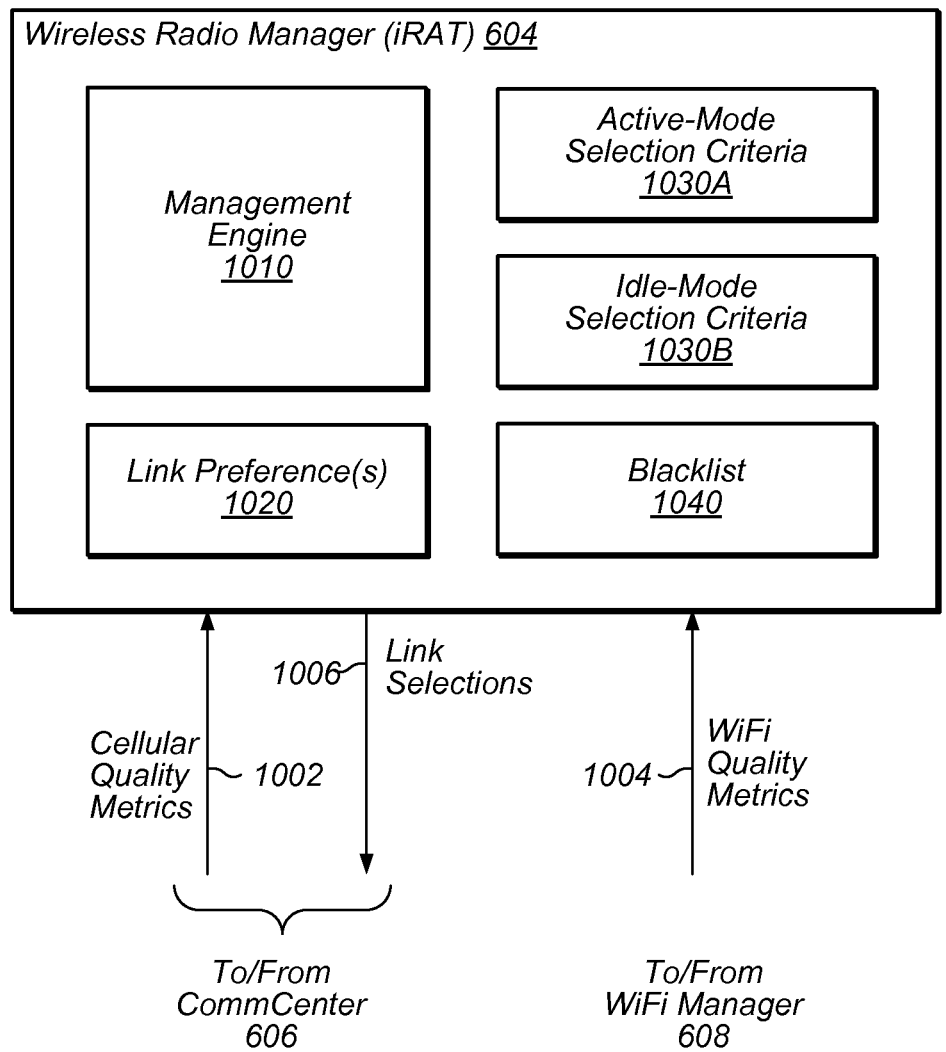
FIG. 10 illustrates a wireless radio manager, according to some embodiments.

FIGS. 10—Techniques to Improve Handovers Between Short-Range and Long-Range Wireless Networks Various techniques may be used to improve communications that may be handed over between short-range (e.g., WiFi and Bluetooth), and long-range (e.g., cellular) wireless networks. As will be described below, in some embodiments, mobile device (UE) 106 allows the setting of a preferred radio access technology (RAT) to be used for communicating network traffic. In such an embodiment, UE 106 attempts to communicate traffic using the preferred RAT as long as a quality associated with the RAT is sufficiently high that communication of the traffic is adequately sustained over the RAT. (As used herein, the term quality refers generally to the degree that a link can accurately convey data in a timely manner. A quality of a link may be assessed using any of various metrics and any of various criteria such as those discussed below.) If the quality declines below a minimum threshold, however, UE 106 selects another RAT for the traffic until the quality of the link improves. For example, in some embodiments, a user may specify a preference for using a cellular RAT when communicating voice traffic for a call. If the cellular link is unable to maintain the call, UE 106 may determine to handover the call to a WiFi network and communicate the traffic using a WiFi RAT. If the cellular link later improves, UE 106 may handover the call back to the cellular link in order to use the preferred cellular RAT specified by the user.

As will also be discussed, in various embodiments, UE 106 may employ techniques to reduce the frequency of handovers between short-range (e.g., WiFi and Bluetooth), and long-range (e.g., cellular) wireless networks. Accordingly, in some embodiments, UE 106 may analyze a moving average of packet error rates (PER) for a network and/or count a number of handovers from the network, among other possible metrics. If PERs and/or the number of handovers for a communication session (e.g., a call) exceeds a permissible threshold, UE 106 may temporarily blacklist the network for the duration of the communication session. In some embodiments, UE 106 may also employ a predetermined delay after a handover is performed before attempting another handover.

In various embodiments, UE 106 may implement one or more of these techniques through wireless radio manager (iRAT) 604 mentioned above and described below in further detail. In other embodiments, functionality described with respect to iRAT 604 may be implemented by other hardware and/or software in UE 106.

Turning now to FIG. 10, a block diagram of iRAT 604 is depicted, according to some embodiments. In the illustrated embodiment, iRAT 604 includes a management engine 1010, link preferences 1020, selection criteria 1030, and a blacklist 1040. As shown, iRAT 604 may receive cellular quality metrics 1002 from communication center 606 and WiFi quality metrics 1004 from WiFi manager 608 as well as issue link selections 1006 to unit 606. In various embodiments, iRAT 604 may be implemented differently than shown. Accordingly, while iRAT 604 is depicted as receiving WiFi quality metrics, in embodiment, iRAT 604 may receive quality metrics for other short-range RATs (such as Bluetooth, Zigbee, etc.) in order to implement functionality described herein.

Management engine 1010 may analyze cellular quality metrics 1002 and WiFi quality metrics 1004 to determine an appropriate link selection 1006 for routing network traffic. In the illustrated embodiment, engine 1010 provides link selection 1006 to CommCenter 606; in other embodiments, engine 1010 may indicate link selection 1006 differently than shown. In various embodiments, engine 1010 makes link selections 1006 in accordance with a specified link preference 1020. For example, engine 1010 may instruct CommCenter 606 to communicate traffic over the preferred link specified by link preference 1020; however, if the quality of the preferred link is unable to satisfy a minimum quality of service (QoS) for the traffic, engine 1010 may determine to instruct unit 606 to communicate the traffic over a non-preferred link until the quality of the preferred link improves. In the illustrated embodiment, engine 1010 evaluates cellular quality based on cellular quality metrics 1002 and WiFi quality based on WiFi quality metrics 1004. Engine 1010 then determines whether to initiate a handover of traffic from a cellular link to a WiFi link (or from a WiFi link to a cellular link) based on selection criteria 1030.

In various embodiments, engine 1010 evaluates WiFi and cellular links when UE 106 is actively communicating application data (i.e., in an active mode) as well as when UE 106 is not currently communicating application data (i.e., in an idle mode). (As used herein, the term "application data" refers to data that is generated by an application executing on a mobile device and may correspond to application layer traffic; application data stands in contrast to management traffic that is generated to establish and maintain WiFi and cellular links.)

In some embodiments, when UE 106 is in idle mode, engine 1010 may implement a preferred-link policy such that engine 1010 initially selects the link specified by link preference 1020 and issues a selection 1006 to cause UE 106 to be configured to communicate over that link. For example, if link preference 1020 is set so that a cellular link is the preferred link, engine 1010 may issue a selection 1006 for the cellular link to cause performance of various configuration operations such as 1) activating a cellular context and 2) registering with an IMS over the cellular link so that subsequent traffic is routed via that link. (If selecting a WiFi link, in some embodiments, engine 1010 may issue a selection 1006 to cause performance of configuration operations such as 1) establishing an internet key exchange (IKE) session with ePDG 530 to create a tunnel and 2) register with an IMS over the WiFi link via the tunnel.) In implementing the preferred-link policy, engine 1010 may also evaluate quality metrics for only the preferred link (quality metrics 1002 of the cellular link in the example above) while it is the selected link. In other embodiments, however, engine 1010 may evaluate quality metrics for multiple links simultaneously (e.g., both quality metrics 1002 and 1004). In the event that the quality of the preferred link is poor (e.g., as indicated by metrics 1002 or 1004 failing to meet criteria 1030 discussed below), engine 1010 may issue another link selection 1006 for a non-preferred link and cause UE 106 to be configured accordingly—e.g., registering with the IMS over a WiFi link if cellular is the preferred link. If the quality of the preferred link later improves, engine 1010 may issue another link selection 1006 for the preferred link.

In some embodiments, when UE 106 is in active mode, engine 1010 may implement an active-link policy such that engine 1010 attempts to maintain a communication session over the active link regardless of whether it is the preferred link. In implementing such a policy, engine 1010 may evaluate quality metrics for only the active link. For example, if cellular is the preferred link yet a call is established over the WiFi link, engine 1010 evaluates WiFi quality metrics 1004 and initiates a handover to the cellular link only if WiFi quality becomes poor. (In other embodiments, however, engine 1010 may not implement an active-link policy, and thus, may initiate a handover if WiFi quality becomes poor and/or if cellular quality significantly improves). Thus, by implementing an active-link policy in some embodiments, engine 1010 may be able to reduce the number of handovers in some instances. As will be discussed below, in some embodiments, the particular quality metrics 1002 and 1004 being evaluated may differ based on whether UE 106 is in active mode or in idle mode. Engine 1010 may also evaluate quality metrics against different selection criteria 1030 based on whether UE 106 is in active or idle modes.

In various embodiments, engine 1010 waits for a predetermined period after making a link selection 1006 before making another link selection 1006 to minimize the frequency of handovers. This predetermined period may be longer if the link selection 1006 is of the preferred link, and shorter (or zero) if the link selection 1006 is of a non-preferred link. For example, in some embodiments, this delay may be between 40-80 seconds (e.g., 60 seconds in some embodiments) when in active mode and a handover to a cellular link has just been completed, where the cellular link is preferred. In some embodiments, this delay may be between 10-30 seconds (e.g., 20 seconds in some embodiments) when in idle mode and the cellular link has just been selected (e.g., a cellular PDN activation and IMS registration have just occurred). In some embodiments, this delay may be substantially shorter, such as in the range from zero to approximately 5 seconds, if engine 1010 has just selected the WiFi link (regardless of whether UE 106 is in active or idle modes), where the WiFi link is non-preferred. In some instances, this shorter delay may be warranted because a WiFi link is more susceptible to dropping and/or degrading abruptly due to its shorter range. Accordingly, in some embodiments, engine 1010 may select the delay length based on the preferred link specified by link preference 1020. For example, in some embodiments, engine 1010 may select a longer length after reading preference 1020 and determining from preference 1020 that a cellular link is the preferred link. In some embodiments, evaluation of quality metrics 1002 and 1004 may occur independently of whether a delay is being performed. For example, in some embodiments, engine 1010 may evaluate quality metrics 1002 once a second and quality metrics 1004 once every five seconds regardless of the delaying being used. In other embodiments, when a delay is being used, however, engine 1010 may also delay evaluation of quality metrics 1002 and 1004.

Cellular quality metrics 1002 may include any of various metrics indicative of cellular quality. Accordingly, quality metrics 1002 (as well as quality metrics 1004 discussed below) may include metrics from the physical layer, data link layer, network layer, transport layer, and/or application layer. In various embodiments, quality metrics 1002 may include link quality metrics (LQMs) such as MAC hybrid automatic repeat request (HARM) packet loss, downlink radio link control (RLC) packet loss, uplink Packet Data Convergence Protocol (PDCP) packet loss, reference signal received power (RSRP), signal-to-noise ratio (SNR), random-access channel (RACH) failure, etc. In some embodiments, engine 1010 may rely on different quality metrics 1002 depending on whether UE 106 is in an active mode or an idle mode. In some instances, quality metrics 1002 may be more prevalent and better indicative of quality when the UE 106 is in an active mode than when in an idle mode. As such, engine 1010 may give greater weight to quality metrics 1002 and/or quality metrics 1004 collected for an active link (i.e., the link being used when UE 106 is active).

WiFi quality metrics 1004 may include any of various metrics indicative of WiFi quality. In some embodiments, quality metrics 1004 include radio quality indicators such as a received signal strength indicator (RSSI), SNR, a round-trip time (RTT), etc. In some embodiments, quality metrics also include packet error rates (PERs) calculated over a moving average. In some instances, PERs may serve as a more reliable metric of quality (practically for multimedia communication sessions) than RSSI and SNR as a communication session may experience problems from packet loss in spite of RSSI being high and SNR being low. Engine 1010 may calculate an average PER based on any of various sources depending on whether UE 106 is in idle or active mode. Accordingly, in some embodiments, PERs may be calculated based on management traffic (e.g., WiFi MAC control frames), traffic for a particular communication session (e.g., PERs for a real-time transport protocol (RTP) session), and/or background traffic unrelated to the particular communication session, etc. In instances when UE 106 is in an idle mode, engine 1010 may calculate a moving average for PER over a longer interval (e.g., 15-45 seconds in some embodiments) than an interval used when UE 106 is in active mode (e.g., 3-5 seconds in some embodiments). In some embodiments, quality metrics 1004 may include non-radio metrics such as a motion state from a motion processor (e.g., whether the UE 106 is experiencing movement as detected by an accelerometer), location information (e.g., GPS data), etc. As with quality metrics 1002, in some instances, different quality metrics 1004 may be available for evaluation depending on whether UE 106 is in active mode or idle mode. For example, when a call is active over WiFi, engine 1010 may use various RTP metrics such as RTP packet loss in decision making.

Link preference 1020 may be a stored preference for using a particular RAT. Accordingly, in some embodiments, link preference 1020 may specify a preference for a cellular link, a preference for a WiFi link, or no preference. In some embodiments, when link preference 1020 indicates a cellular-link preference, engine 1010 may make a link selection 1006 for a cellular link as long as link can adequately support traffic as will be described below with respect to FIGS. 11A-11D. Alternatively, when link preference 1020 indicates a WiFi-link preference, engine 1010 may issue a link selection for a WiFi link as along as the link can adequately support traffic. In some embodiments, link preference 1020 may pertain to all network traffic. In other embodiments, link preferences 1020 may be set for particular applications. For example, in some embodiments, a cellular-link preference may be set for voice communications while a WiFi-link preference may be set for hypertext transfer protocol (HTTP) traffic. Link preferences 1020 may also be set by any of various entities such as the user (e.g., via a user interface of UE 106), the carrier, the application generating the traffic (e.g., a web browser), etc. In some embodiments, link preferences 1020 may also be set automatically based on particular circumstances such as whether UE 106 is roaming, whether UE 106 is changing locations, etc.

It is noted that link preference 1020 stands in contrast to a setting that requires traffic to be sent over a particular link all the time—i.e., regardless of whether the link can actually support the traffic. Use of link preference 1020 also stands in contrast to selection schemes that merely attempt to select the link having the best quality. Rather, in various embodiments, engine 1010 favors the link indicated by link preference 1020 and transitions over to a non-preferred link only when the condition of the preferred link significantly deteriorates. As such, use of link preference 1020 may reduce the number of handovers performed by UE 106 in some instances. In some embodiments in which an IP multimedia subsystem (IMS) is used, use of link preference 1020 may also reduce the number of registrations for UE 106 with the IMS.

Selection criteria 1030, in some embodiments, dictate whether engine 1010 should make a new link selection 1006 based on quality metrics 1002 and/or quality metrics 1004.

In the illustrated embodiment, engine 1010 uses different criteria depending on whether UE 106 is in idle mode or in active mode as indicated by active-mode selection criteria 1030A and idle-mode selection criteria 1030B. Criteria 1030 may also be different depending on link preference 1020. Accordingly, in some embodiments, if link preference 1020 specifies a cellular-link preference, active-mode selection criteria 1030A dictates that a handover be performed from a cellular link to a WiFi link based on both high (good) quality metrics 1004 and low (poor) quality metrics 1002, such as if link quality metrics for the cellular link are poor the cellular signal bar is one, and/or no cellular service is detected. In such embodiments, criteria 1030A may dictate that a handover from WiFi to cellular be performed based on low quality metrics 1004 and/or high quality metrics 1002, such as if link quality metrics for the cellular link are good and/or the cellular signal bar is 3 or more. In some embodiments, criteria 1030A may also dictate that a handover be performed from a WiFi link to a cellular link in response to a moving average PER calculated over an interval of 30 seconds or more satisfying a first threshold (e.g., exceeding 10% in some embodiments) and/or an average PER calculated over a 5 second interval satisfying a second, higher threshold. In some embodiments, if link preference 1020 specifies a cellular-link preference, idle-mode selection criteria 1030B may dictate that UE 106 register with the WiFi link and establish subsequent communication sessions over the WiFi link based on a quality of the cellular link being poor. In some embodiments, the quality of the cellular link may be considered poor based on, for example, one or more of the following: a cellular signal bar of 1 or less (out of five bars), no service status, and/or poor link quality metrics 1002 (as identified by a set of quality thresholds). In such embodiments, criteria 1030B may dictate that UE 106 register with a cellular link and establish subsequent communication sessions over the cellular link only if quality metrics 1002 improve significantly such as the cellular signal bar being four or five bars and quality metrics 1002 being good enough to ensure adequate support. In some embodiments, criteria 1030B may also specify that the cellular link be selected over the WiFi link in response to a moving average PER calculated for the WiFi link over a 15-40 second interval satisfying a threshold (e.g., exceeding 10% in some embodiments).

Blacklist 1040, in some embodiments, restricts the RATs that may be selected by engine 1010. In some embodiments, blacklist 1040 may restrict RATs by specifying particular networks that cannot be used. For example, blacklist 1040 may specify service set identifiers (SSIDs), basic service set indications (BSSID), and/or media access control (MAC) addresses for particular WiFi networks. Blacklist 1040 may also specify particular interfaces to avoid such as Bluetooth/WLAN 329 discussed above with respect to FIG. 3. Particular elements (e.g., networks, interfaces, etc.) may be assigned to the blacklist 1040 based on various criteria. Accordingly, in some embodiments, elements are assigned if a moving average for a PER of a link exceeds a threshold (e.g., 10% for moving average calculated over an interval of 30 seconds or more). In some embodiments, elements are assigned if a number of handovers for a link exceeds a threshold (e.g., 3 handovers for a communication session). In such an embodiment, engine 1010 may count the number of handovers to determine whether an element should be assigned to blacklist 1040. In some embodiments, engine 1010 does not count all handovers, but rather, counts the number of handovers that occur due to high PERs when sufficient RSSI and SNR exists to maintain a communication session. In various embodiments, elements may be temporarily assigned to blacklist 1040. For example, if UE 106 is participating in a voice communication session, engine 1010 may assign a WiFi network to the blacklist for the remaining duration of the session. (Although list 1040 is described as a blacklist, in some embodiments, list 1040 may be implemented as a white list such that UE 106 only communicates using RATs assigned to the list.) Use of a blacklist is described in further detail below with respect to FIGS. 12A and 12B.

FIGS. 11A-D—Link Selection and Handovers for Cellular and/or WiFi Link Preferences FIGS. 11A-11D depict some embodiments of methods for determining whether to use a cellular link or a WiFi link for active and idle modes for cellular and/or WiFi link preferences.

Figure 11A:
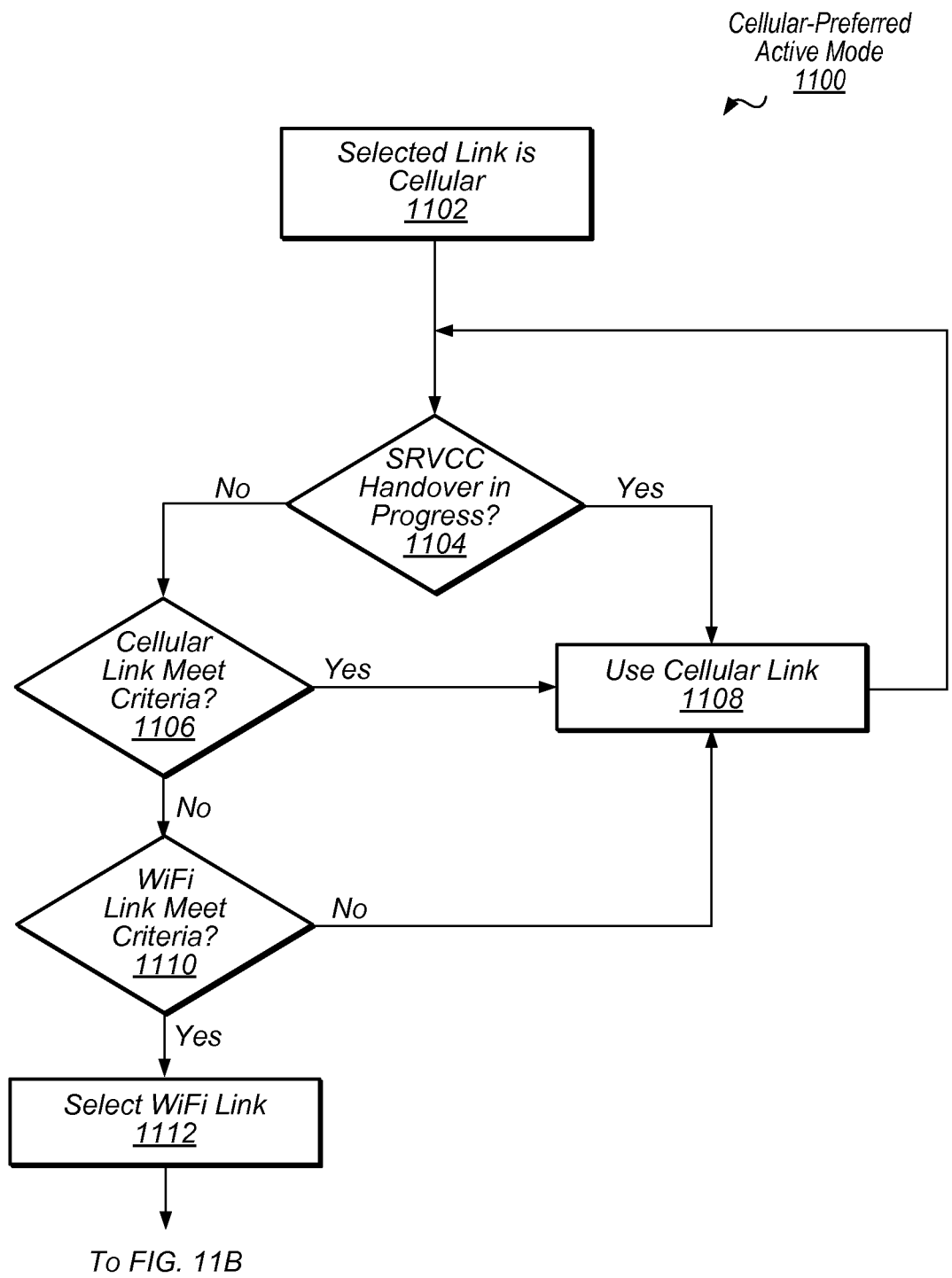
FIGS. 11A-11D illustrate some embodiments of methods for selecting a link associated with a radio access technology (e.g., cellular or WiFi) and associated handovers for cellular and/or WiFi link preferences.

Turning now to FIG. 11A, a flow diagram of a method 1100 for a cellular-preferred active mode is shown, according to some embodiments. In various embodiments, method 1100A is performed by a mobile device (such as UE 106 via iRAT 604) that is communicating traffic when cellular is set as the preferred link for the traffic. In some embodiments, performance of method 1100 may reduce the signaling load on an IMS and a cellular link by avoiding frequent IMS and WiFi signaling. Performance of method 1100 may also enhance a user's experience by providing better application services such as a better voice calling service.

In some embodiments, method 1100 begins in 1102 with cellular being the selected link. In some embodiments, 1102 corresponds to engine 1010 issuing a selection 1006 in accordance with link preference 1020, which, as discussed above, may be set based on one or more of receiving an input from a user via a user interface of the mobile device, a request from a carrier of the mobile device, automatically by the mobile device, etc. In some instances, this selection may have occurred while the mobile device was in idle mode. As discussed above, the selection of the cellular link may also pertain to all traffic or a subset—e.g., traffic of a particular application such as a voice communication.

In 1104, a determination is made whether a single radio-voice call continuity (SRVCC) handover (such as discussed above with respect to FIG. 8) is in progress. (As discussed below with respect to FIG. 11C, 1104 may be omitted if the mobile device is operating in idle mode.) If an SRVCC handover is in progress, method 1100 proceeds to 1108, where the mobile device continues to use the cellular link. Otherwise, method 1100 proceeds to 1106.

In 1106, a determination is made whether the cellular link can meet criteria for communicating traffic. For example, 1106 may include determining whether a cellular link can adequately support voice over LTE (VoLTE) or a circuit switched voice connection. In various embodiments, 1106 may include evaluating various quality metrics for the cellular link, such as cellular quality metrics 1002, against various criteria, such as selection criteria 1030A. It is noted that the determination in 1106 can be made regardless of the quality of the WiFi link because cellular is set as the preferred link in the illustrated embodiment. That is, if the cellular link can meet the criteria, method 1100 proceeds to use the cellular link at 1108. If not, method 1100 proceeds to 1110. In other embodiments, 1106 and 1110 may be performed in parallel such that method 1100 proceeds to 1108 or 1112 based on both determinations.

In 1110, a determination is made whether the WiFi link can meet criteria for communicating traffic. In various embodiments, 1110 may include evaluating various quality metrics for the WiFi link, such as WiFi quality metrics 1004, against various criteria, such as selection criteria 1030A. If the WiFi link is unable to meet the criteria, method 1100 still proceeds to 1108 since the cellular link is the preferred link. Otherwise, method 1100 proceeds to 1112.

In 1108, the mobile device proceeds to use the cellular link to communicate traffic in active mode. Accordingly, if the mobile device was previously using the cellular link, the mobile device continues to do so. As shown, method 1100 may include continuing to evaluate the cellular link at 1104 and 1106 to see if quality becomes poor.

In 1112, the WiFi link is selected. In some embodiments, 1112 may include engine 1010 issuing a selection 1006 to initiate a handover from cellular to WiFi such as discussed above with respect to FIG. 7. In some embodiments, 1112 may also include registering with an IMS over the WiFi link. In the illustrated embodiment, method 1100 proceeds to FIG. 11B, where the WiFi link is evaluated.

Figure 11B:
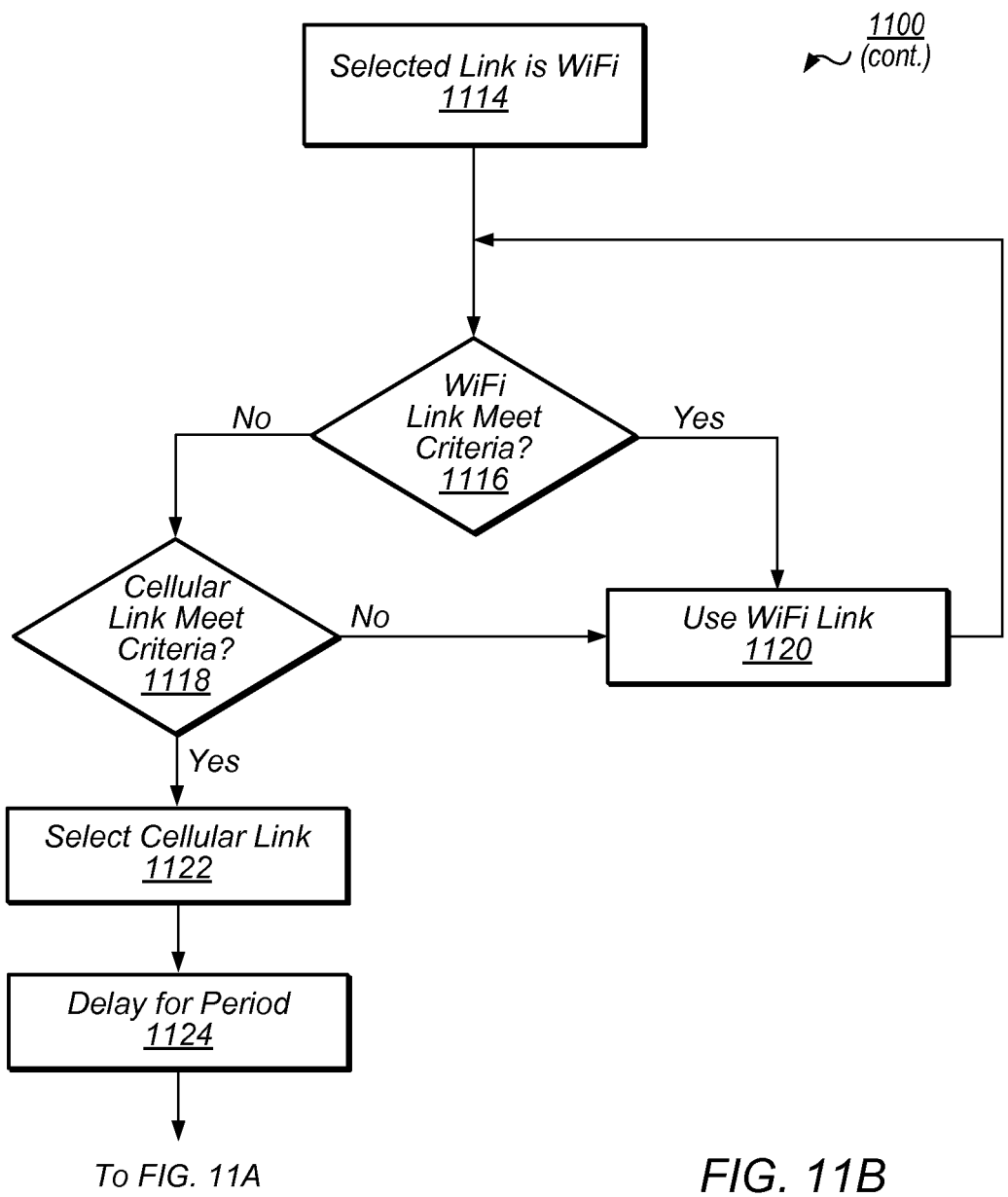

Turning now to FIG. 11B, a flow diagram depicting a continuation of method 1100 is presented, according to some embodiments. In the illustrated embodiment, method 1100 continues with the selected link being WiFi at 1114. As noted above, this selection may occur due to poor quality of the cellular link. In 1116, a determination is made whether the WiFi link can meet criteria for communicating traffic. In various embodiments, 1116 may include evaluating WiFi quality metrics 1004 against selection criteria 1030A. As WiFi is now the active link, the metrics and criteria evaluated at 1116 may differ from those in 1110. If the WiFi link can meet the criteria, the WiFi link is used in 1120 and may be concurrently evaluated at 1116. Otherwise, in 1118, a determination is made whether the cellular link can meet criteria for communicating traffic. (It is noted that the ordering of 1116 and 1118 may differ in some embodiments; 1116 and 1118 may also be performed in parallel.) As cellular is no longer the active link, the metrics and criteria evaluated at 1120 may differ from those at 1106. If the cellular link cannot meet the criteria, method 1100 proceeds to 1120. Otherwise, method 1100 proceeds to select cellular link in 1122. As discussed above, in some embodiments, 1122 may include engine 1010 initiating a handover from WiFi to cellular and registering with an IMS over the cellular link.

After selecting the cellular link, method 1100 includes performing a delay for a period in 1124. As discussed above, in some embodiments, this delay may be 40-80 seconds (e.g., 60 seconds in some embodiments). Although shown as a delay before returning to FIG. 11A, in some embodiments, method 1100 may proceed to 1102-1110 while the delay is being performed. That is, the delay at 1124 may restrict the entrance of method 1100 into 1112 where a handover to the WiFi link would be initiated in some embodiments.

Although FIGS. 11A and 11B depict a method for cellular-preferred active-mode, it is noted that a method is also contemplated for WiFi-preferred active-mode. In some embodiments, the method for WiFi-preferred active mode is implemented in a similar manner as method 1100.

Figure 11C:
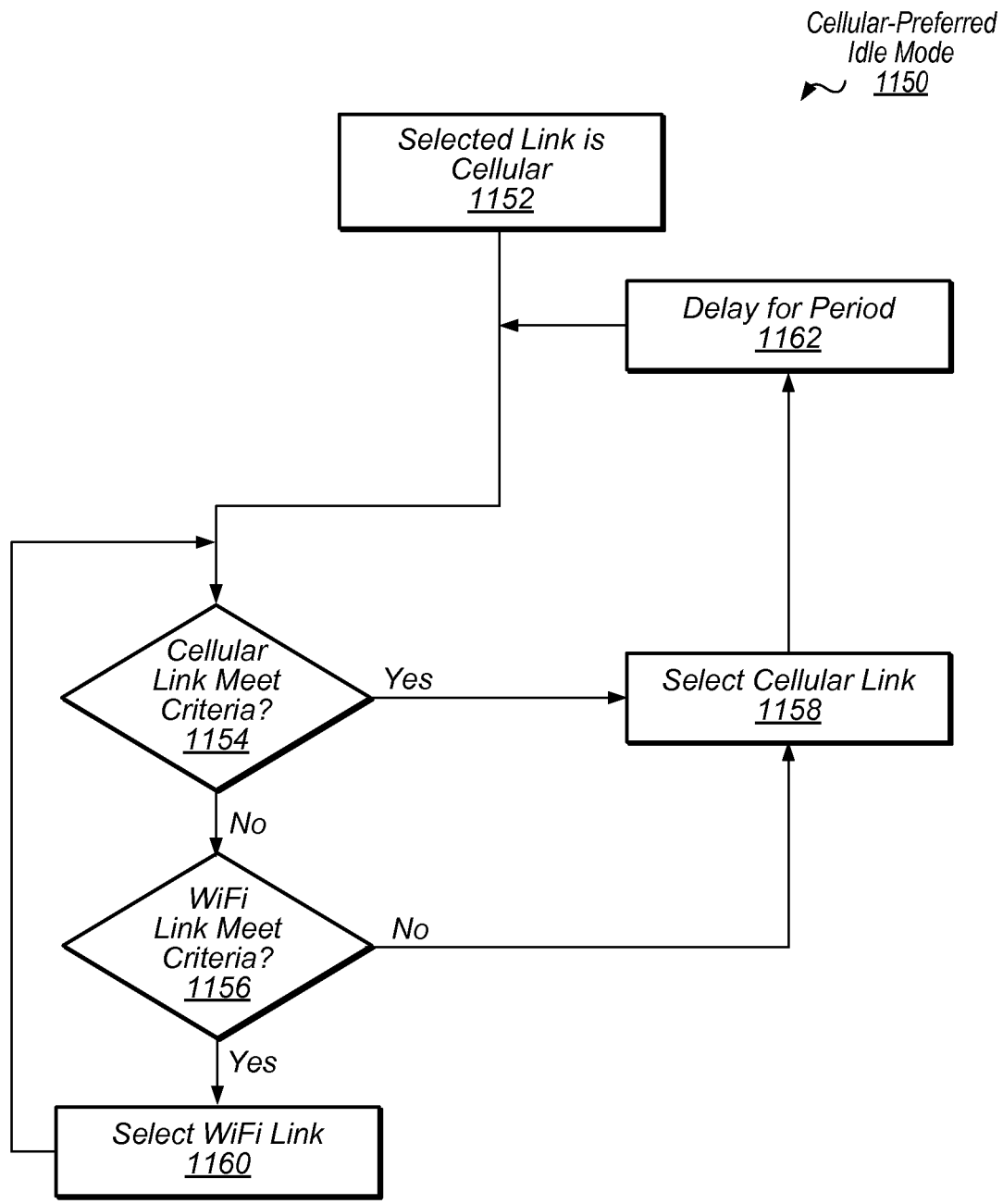

Turning now to FIG. 11C, a flow diagram of a method 1150 for a cellular-preferred idle mode is shown, according to some embodiments. In various embodiments, method 1150 is performed by a mobile device (such as UE 106 via iRAT 604) that is not communicating application traffic when cellular is set as the preferred link for traffic. In some embodiments, method 1150 may achieve similar benefits to those discussed above with respect to method 1100.

In some embodiments, method 1150 begins in 1152 with the selected link being cellular. As discussed above, in various embodiments, this selection may be made based on link preference 1020 being set to cellular, metrics 1002 and 1004, and/or criteria 1130B. In 1154, a determination is made whether the cellular link can meet criteria for potentially communicating subsequent traffic such as metrics 1002 meeting criteria 1130B (accordingly, in various embodiments, the metrics and criteria assessed at 1154 differ from those assessed at 1106). If the cellular link meets the criteria, method proceeds to use the cellular link at 1158 (or select the cellular link if not already selected). Otherwise, method 1150 proceeds to 1156 in which a determination is made whether the WiFi link can meet criteria for communicating subsequent traffic such as criteria 1130B (accordingly, metrics and criteria assessed at 1156 may differ from those in 1110). If the WiFi link meets the criteria, method 1150 proceeds to 1160 in which the WiFi link is selected. Otherwise, method 1150 proceeds to 1158. As with method 1100, method 1150 may implement a delay for a period at 1162 after 1158. In some embodiments, the period in 1162 may be shorter than that in 1124. For example, in some embodiments, the delay may be between 10-30 seconds (e.g., 20 seconds in some embodiments) when in idle mode as discussed above.

Figure 11D:
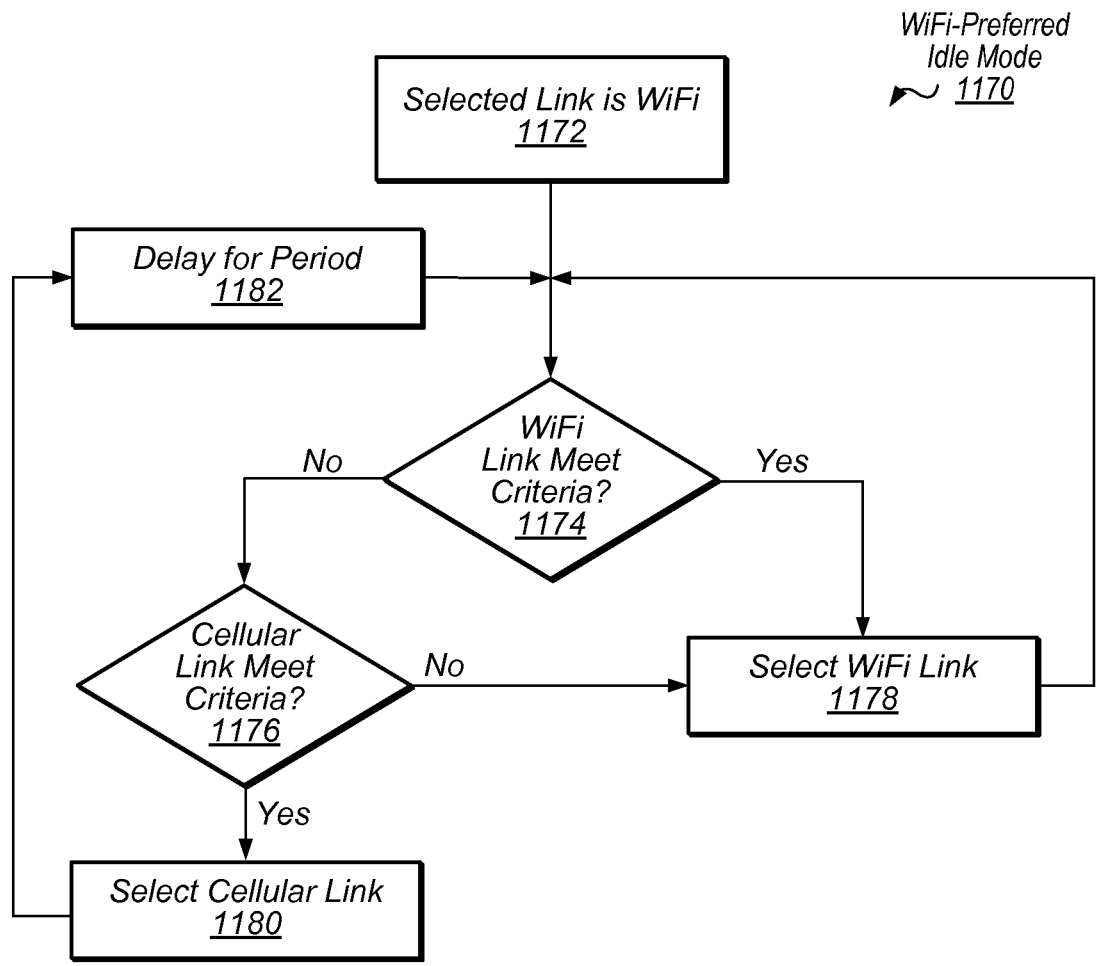

Turning now to FIG. 11D, a flow diagram of a method 1170 for a WiFi-preferred idle mode is shown, according to some embodiments. In various embodiments, method 1170 is performed by a mobile device (such as UE 106 via iRAT 604) that is not communicating application traffic when WiFi is set as the preferred link for traffic. In some embodiments, method 1170 may achieve similar benefits to those discussed above with respect to method 1150.

In some embodiments, method 1170 begins in 1172 with the selected link being WiFi. This selection may be made based on link preference 1120 being set to WiFi, metrics 1002 and 1004, and/or criteria 1130B. In 1174, a determination is made whether the WiFi link can meet criteria for potentially communicating subsequent traffic such as metrics 1004 meeting criteria 1130B. If the WiFi link meets the criteria, method 1170 proceeds to use the WiFi link at 1178 (or select the WiFi link if not already selected). Otherwise, method 1170 proceeds to 1176 in which a determination is made whether the cellular link can meet criteria for communicating subsequent traffic such as criteria 1130B. If the cellular link meets the criteria, method 1170 proceeds to 1180 in which the cellular link is selected. Otherwise, method 1170 proceeds to 1178 in which the WiFi link is used. As with method 1150, method 1170 may implement a delay for a period at 1182 after 1180. In some embodiments, the period in 1182 may be shorter than that in 1124. For example, in some embodiments, the delay may be between 10-30 seconds (e.g., 20 seconds in some embodiments) when in idle mode.

Figure 12A:
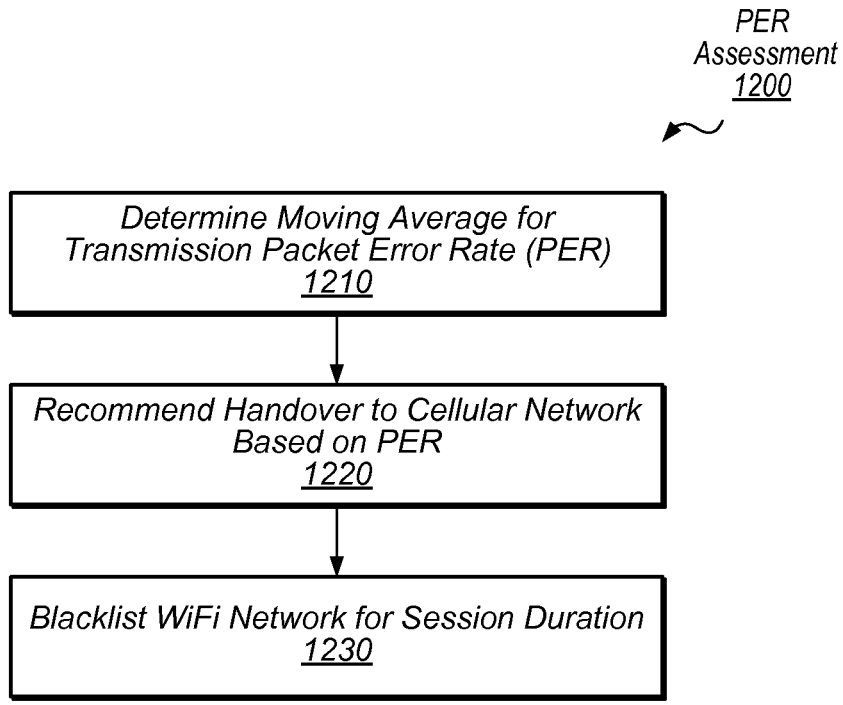
FIGS. 12A-12B illustrate some embodiments of methods for assessing networks for blacklisting.
Figure 12B:
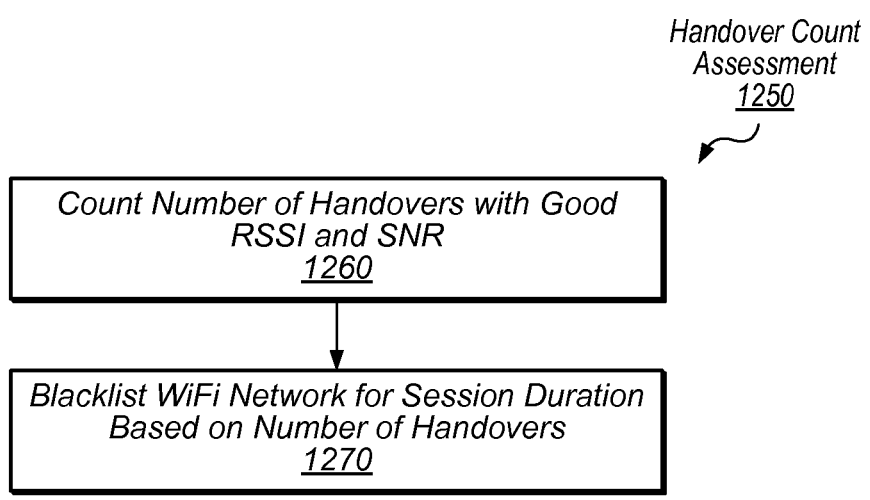

FIGS. 12A and 12B—Blacklisting RATs

Turning now to FIG. 12A, a flow diagram of method 1200 for assessing packet error rates (PERs) is depicted, according to some embodiments. In various embodiments, method 1200 is performed by a mobile device (such as UE 106 via iRAT 604) evaluating a WiFi link. In some embodiments, performance of method 1200 may reduce the frequency of handovers when a WiFi link is experiencing high interference—thus, improving a user's experience.

In 1210, a moving average for transmission PERs is determined. As discussed above, in some embodiments, this moving average may be determined based on one or more of management traffic (e.g., received beacon frames), traffic specific to an application (e.g., VoIP for a telephone application), background traffic unrelated to the application (e.g., internet message access protocol (IMAP) traffic), etc. In some embodiments, the moving average may be determined over an interval of 15-45 seconds (e.g., 30 seconds in some embodiments). In some embodiments, 1210 may include determining other metrics used in 1220 and 1230 such as determining a moving average of RTP packet less.

In 1220, a recommendation to hand over to a cellular network is made based on the determined PER. In some embodiments, this recommendation is made in response to the PER exceeding 10%. In other embodiments, other thresholds may be used. In some embodiments, the recommendation may be based on other metrics as well such as cellular quality metrics 1002 and/or WiFi quality metrics 1004.

In 1230, the WiFi network is blacklisted (i.e., assigned to a blacklist) for the session duration. For example, if the communication session is a voice call, the WiFi network may be blacklisted for the remainder of the call. As discussed with blacklist 1040, 1230 may include storing a BSSID, SSID, WiFi interface name of the mobile device, etc. in the blacklist. Once the WiFi network has been blacklisted, the mobile device may continue to communicate using networks not assigned to the blacklist such as the cellular network or other WiFi networks.

Turning now to FIG. 12B, a flow diagram of method 1250 for assessing handover frequency is depicted, according to some embodiments. In various embodiments, method 1250 is performed by a mobile device (such as UE 106 via iRAT 604) evaluating a WiFi link. In some embodiments, performance of method 1250 may reduce the frequency of handovers when a WiFi link is experiencing high interference.

In 1260, a number of handovers with good RSSI and SNR is counted. In many instances, these handovers may include handovers from the WiFi link that are caused by high PER or packet loss (e.g., RTP packet loss). In various embodiments, 1260 may exclude counting handovers determined to have poor RSSI or SNR based on various criteria such as criteria 1030.

In 1270, a WiFi network is blacklisted for the session duration based on the number of handovers reach a threshold (e.g., 3 handovers from the WiFi network in some embodiments). In some embodiments, 1270 may be implemented in a similar manner as 1230 described above.

Embodiments of the present disclosure may be realized in any of various forms. For example, various embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs. For example, some or all of the units included in the UE may be implemented as ASICs, FPGAs, or any other suitable hardware components or modules.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A mobile device, comprising:
a user interface configured to receive an input from a user; and
one or more radios configured to communicate using a plurality of radio access technologies (RATs) including a cellular RAT and a short-range RAT;
wherein the mobile device is configured to:
receive, via the user interface, an indication that the cellular RAT is a preferred RAT of the user for a particular application executable by the mobile device;
store the received indication and a plurality of other preferred-RAT indications for a plurality of applications executable by the mobile device, wherein the other preferred-RAT indications are received via the user interface, wherein a first of the stored indications identifies the cellular RAT as a preferred RAT of a first of the plurality of applications, and wherein a second of the stored indications identifies the short-range RAT as the preferred RAT of a second of the plurality of applications;
establish a communication session for communicating application data of the particular application using the preferred RAT of the particular application; and
in response to determining that a quality of the preferred RAT of the particular application fails to satisfy a set of quality criteria, request that the communication session use the short-range RAT.

2. The mobile device of claim 1, wherein the communication session is a voice communication session using a cellular RAT, and wherein the short-range RAT is a WI-FI RAT; and
wherein the mobile device is configured to register with an internet protocol multimedia subsystem (IMS) over the short-range RAT in response to the determining.

3. The mobile device of claim 1, wherein the mobile device is configured to:
in response to determining that the quality of the preferred RAT of the particular application satisfies the set of quality criteria, request that the communication session use the preferred RAT of the particular application.

4. The mobile device of claim 3, wherein the request that the communication session use the short-range RAT is configured to occur after a delay for a predetermined period.

5. The mobile device of claim 4, wherein the mobile device is configured to:
determine the preferred RAT of the particular application from the indication; and
select a length of the predetermined period based on the determined preferred RAT.

6. The mobile device of claim 1, wherein the mobile device is configured to:

analyze an average packet error rate for the communication session while the communication session uses the short-range RAT; and in response to the average packet error rate satisfying a threshold, request that the communication session use the cellular RAT.

7. The mobile device of claim 6, wherein the mobile device is configured to:

in response to the average packet error rate satisfying the threshold, assign the short-range RAT to a blacklist for a remainder of the communication session, wherein the mobile device is configured to not communicate using RATs assigned to the blacklist.

8. The mobile device of claim 1, wherein the plurality of other preferred-RAT indications includes an indication specifying the short-range RAT as a preferred RAT for communication sessions of a web browser application.

9. The mobile device of claim 1, wherein the determining includes performing a first evaluation of the quality of the preferred RAT of the particular application based on a first set of quality criteria; and wherein the mobile device is configured to:

prior to establishing the communication session, perform a second evaluation of the quality of the preferred RAT of the particular application based on a second set of quality criteria, wherein the second set of criteria is different from the first set of quality criteria; and determine, based on the second evaluation, whether to establish the communication session using the preferred RAT of the particular application or one of the plurality of RATs that is not specified by the indication.

10. The mobile device of claim 9, wherein the first set of quality criteria corresponds to when the mobile device is communicating application data, and wherein the second set of quality criteria corresponds to when the mobile device is not communicating application data.

11. A mobile device, comprising:

a user interface configured to receive an input from a user;

a first radio configured to communicate wirelessly with a base station over a cellular link;

a second radio configured to communicate wirelessly with an access point over a local area network (LAN) link;

wherein the mobile device is configured to:

receive, via the user interface, a first selection of the cellular link as a preferred link of the user for a first application executable by the mobile device;

receive, via the user interface, a second selection of the LAN link as a preferred link of the user for a second application executable by the mobile device;

establishing a communication session for communicating network traffic of the first application using the preferred link for the first application;

establishing a communication session for communicating network traffic of the second application using the preferred link for the second application;

during communication of the first application's network traffic over an active one of the cellular and LAN links, evaluate a quality of the active link; and determine, based on the quality of the active link, whether to handover the communication to a non-active one of the cellular and LAN links.

12. The mobile device of claim 11, wherein the mobile device is configured to:

prior to the communication, evaluate a quality of the preferred link for the first application based on the received first selection; and determine, based on the quality of the preferred link for the first application, whether to use the preferred link for the first application as the active link for the communication.

13. The mobile device of claim 12, wherein the mobile device is configured to:

register with an IP multimedia subsystem (IMS) over the preferred link for the first application in response to determining to use the preferred link for the first application as the active link for the communication.

14. The mobile device of claim 12, wherein the mobile device is configured to:

register with an IP multimedia subsystem (IMS) over a link other than the preferred link for the first application in response to determining to not use the preferred link for the first application as the active link for the communication.

15. The mobile device of claim 11, wherein the mobile device is configured to:

in response to determining to handover the communication to a non-active cellular link, assign a service set identifier (SSID) of the access point to a blacklist for a duration of the communication.

16. The mobile device of claim 11, wherein one of the first and second applications is a web browser.

17. A non-transitory computer readable medium having program instructions stored therein that are executable by a mobile device having one or more radios configured to communicate using a plurality of radio access technologies (RATs) including a cellular RAT and a short-range RAT, wherein the program instructions are executable to cause the mobile device to perform operations comprising:

receiving, via a user interface of the mobile device, a plurality of preferred RAT selections, each identifying the cellular RAT or the short-range RAT as a preferred RAT of a user for a respective one of a plurality of applications executable by the mobile device;

establishing a communication session for communicating application data of a first of the plurality of applications using the preferred RAT identified by a first one of the plurality of preferred RAT selections; and in response to determining that a quality of the preferred RAT fails to satisfy a set of quality criteria, request that the communication session use a non-preferred RAT.

* * * * *